United States Patent
Balasubramanian et al.

(10) Patent No.: US 11,736,895 B2
(45) Date of Patent: *Aug. 22, 2023

(54) VEHICLE-TO-PEDESTRIAN POSITIONING WITH USER EQUIPMENT AND NETWORK ASSISTANCE

(71) Applicant: QUALCOMM Incorporated, San Diego, CA (US)

(72) Inventors: Anantharaman Balasubramanian, San Diego, CA (US); Kapil Gulati, Belle Mead, NJ (US); Chang-Sik Choi, Seoul (KR)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/933,909

(22) Filed: Sep. 21, 2022

(65) Prior Publication Data

US 2023/0018162 A1 Jan. 19, 2023

Related U.S. Application Data

(63) Continuation of application No. 17/302,844, filed on May 13, 2021, now Pat. No. 11,533,586.

(Continued)

(51) Int. Cl.
*H04W 4/02* (2018.01)
*H04L 5/00* (2006.01)
*H04W 4/40* (2018.01)

(52) U.S. Cl.
CPC .......... *H04W 4/023* (2013.01); *H04L 5/0048* (2013.01); *H04W 4/40* (2018.02)

(58) Field of Classification Search
CPC .. H04W 64/00; H04W 64/003; H04W 64/006
See application file for complete search history.

(56) References Cited

U.S. PATENT DOCUMENTS

2018/0124771 A1 5/2018 Mok et al.
2019/0230619 A1 7/2019 Cui et al.
(Continued)

FOREIGN PATENT DOCUMENTS

WO  WO-2018199652 A1 * 11/2018 ............. H04W 4/40

OTHER PUBLICATIONS

Fraunhofer IIS., et al., "Study on NR Sidelink Positioning," 3GPP Draft, 3GPP TSG RAN Meeting #88e, RP-201062, 3rd Generation Partnership Project (3GPP), Mobile Competence Centre, 650, Route Des Lucioles, F-06921, Sophia-Antipolis Cedex, France, vol. TSG RAN. No. Electronic Meeting, Jun. 29, 2020-Jul. 3, 2020, Jun. 22, 2020 (Jun. 22, 2020), XP051903719, 3 pages, Retrieved from the Internet: URL: https://ftp.3gpp.org/tsg_ran/TSG_RAN/TSGR_88e/Docs/RP-201062.zip RP-201062_Study-on-NR-Sidelink-Positioning. docx [retrieved on Jun. 22, 2020] 1. Introduction, 2. Motivation.

(Continued)

*Primary Examiner* — Kevin Kim
(74) *Attorney, Agent, or Firm* — Harrity & Harrity, LLP

(57) ABSTRACT

Various aspects of the present disclosure generally relate to wireless communication. In some aspects, a network node may receive a first set of ranging measurements based at least in part on a first one or more positioning reference signals communicated over a sidelink between a pedestrian user equipment (P-UE) and a vehicle UE (V-UE). The network node may receive a second set of ranging measurements based at least in part on a second one or more positioning reference signals communicated over an access link between the P-UE and one or more base stations. The network node may transmit, to the P-UE, an estimated position of the P-UE. For example, in some aspects, the estimated position of the P-UE may be based at least in part on the first set of ranging measurements and the second set of ranging measurements. Numerous other aspects are provided.

30 Claims, 13 Drawing Sheets

Related U.S. Application Data

(60) Provisional application No. 63/049,001, filed on Jul. 7, 2020.

(56) References Cited

U.S. PATENT DOCUMENTS

| | | |
|---|---|---|
| 2019/0302220 A1 | 10/2019 | Kumar et al. |
| 2021/0385710 A1 | 12/2021 | Jin et al. |
| 2022/0014872 A1 | 1/2022 | Balasubramanian et al. |

OTHER PUBLICATIONS

Huawei, et al., "LCS Architecture Enhancement Addressing Key Issue #1 in TR 23.731," 3GPP Draft, SA WG2 Meeting #127, S2-183965, S2-183691, WAS3691 LCS Architecture Enhancement Addressing KI1_REMOVEPC5, 3rd Generation Partnership Project (3GPP), Mobile Competence Centre, 650, Route Des Lucioles, F-06921, Sophia-Antipolis Cedex, France, vol. SA WG2. No. Sanya, China, Apr. 16, 2018- Apr. 20, 2018, Apr. 19, 2018 (Apr. 19, 2018), XP051432596, 3 pages, Retrieved from the Internet: URL:http://www.3gpp.org/ftp/Meetings%5F3GPP%5FSYNC/SA2/Docs/ [retrieved on Apr. 19, 2018] paragraphs [1.6.X.1], [6.X.2] abstract, the whole document.

International Search Report and Written Opinion—PCT/US2021/070558—ISA/EPO—dated Sep. 7, 2021.

\* cited by examiner

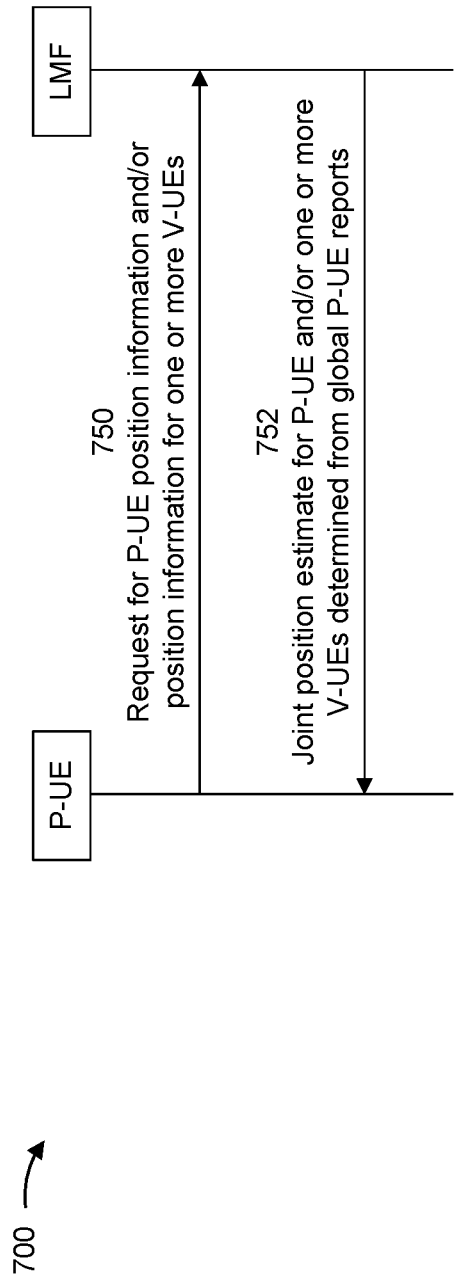
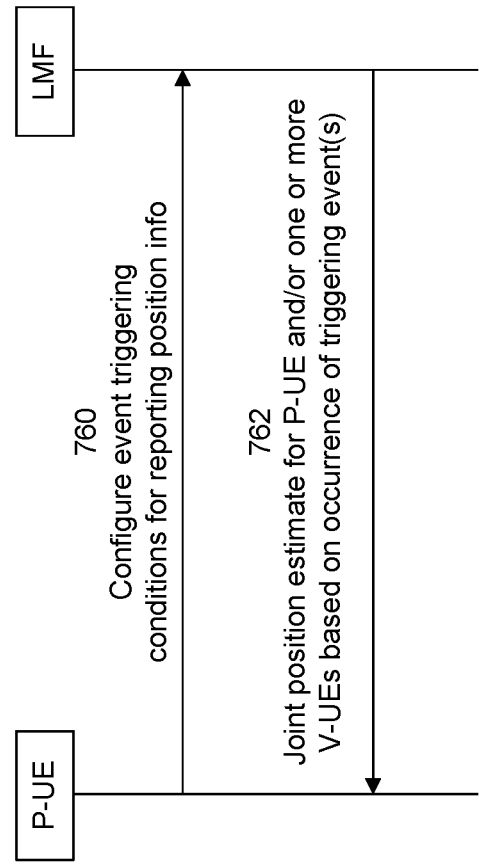
FIG. 7B
FIG. 7C

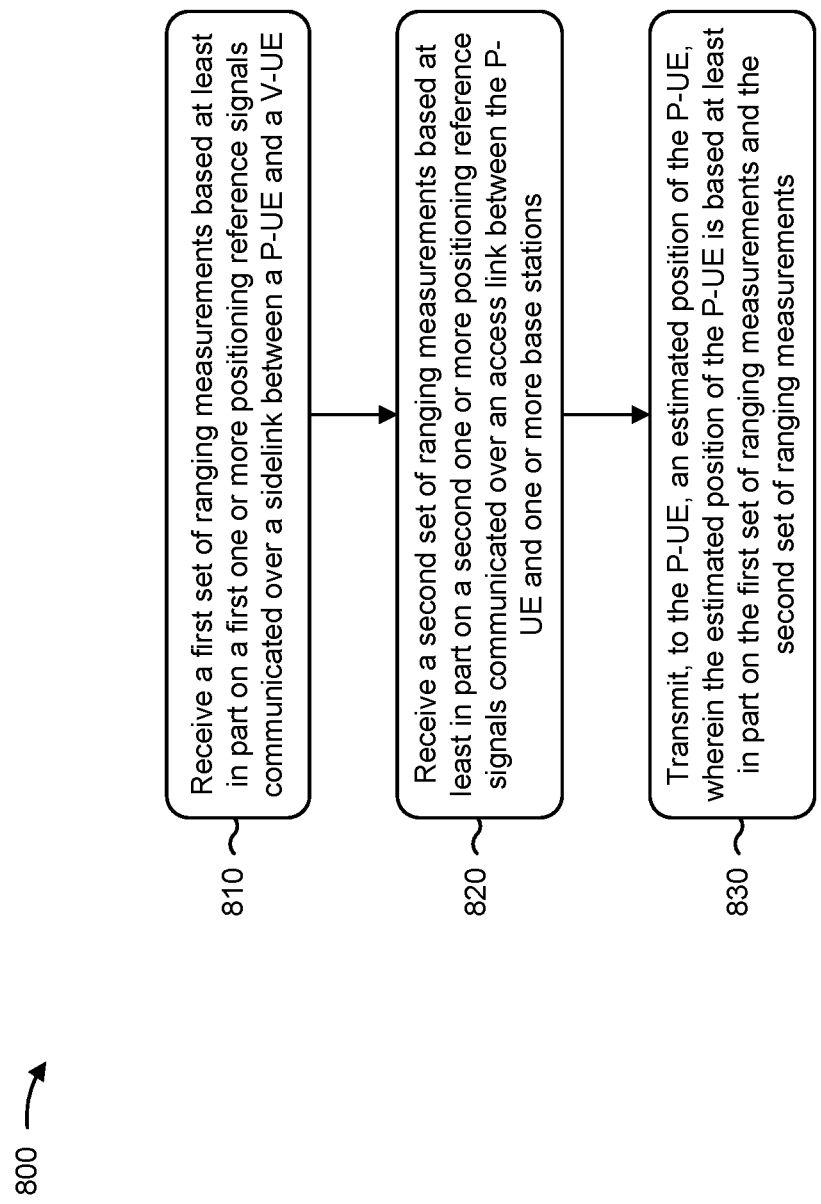

VEHICLE-TO-PEDESTRIAN POSITIONING WITH USER EQUIPMENT AND NETWORK ASSISTANCE

CROSS-REFERENCE TO RELATED APPLICATIONS

This application is a continuation of U.S. patent application Ser. No. 17/302,844, filed May 13, 2021, entitled "VEHICLE-TO-PEDESTRIAN POSITIONING WITH USER EQUIPMENT AND NETWORK ASSISTANCE," which claims priority to U.S. Provisional Patent Application No. 63/049,001, filed on Jul. 7, 2020, entitled "VEHICLE-TO-PEDESTRIAN POSITIONING WITH USER EQUIPMENT AND NETWORK ASSISTANCE," the contents of which are incorporated herein by reference in their entireties.

FIELD OF THE DISCLOSURE

Aspects of the present disclosure generally relate to wireless communication and to techniques and apparatuses.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a network node may include: receiving a first set of ranging measurements based at least in part on a first one or more positioning reference signals communicated over a sidelink between a pedestrian user equipment (P-UE) and a vehicle user equipment (V-UE); receiving a second set of ranging measurements based at least in part on a second one or more positioning reference signals communicated over an access link between the P-UE and one or more base stations; and transmitting, to the P-UE, an estimated position of the P-UE, wherein the estimated position of the P-UE is based at least in part on the first set of ranging measurements and the second set of ranging measurements.

In some aspects, a method of wireless communication performed by a P-UE may include: transmitting, to a network node, a first set of ranging measurements based at least in part on a first one or more positioning reference signals communicated over a sidelink between the P-UE and a V-UE; transmitting, to one or more base stations, a second set of ranging measurements based at least in part on a second one or more positioning reference signals communicated over an access link between the P-UE and the one or more base stations; and receiving, from the network node, an estimated position of the P-UE, wherein the estimated position of the P-UE is based at least in part on the first set of ranging measurements and the second set of ranging measurements.

In some aspects, a network node for wireless communication may include a transceiver, a memory, and one or more processors, coupled to the transceiver and the memory, configured to: receive, via the transceiver, a first set of ranging measurements based at least in part on a first one or more positioning reference signals communicated over a sidelink between a P-UE and a V-UE; receive, via the transceiver, a second set of ranging measurements based at least in part on a second one or more positioning reference signals communicated over an access link between the P-UE and one or more base stations; and transmit, to the P-UE, via the transceiver, an estimated position of the P-UE, wherein the estimated position of the P-UE is based at least in part on the first set of ranging measurements and the second set of ranging measurements.

In some aspects, a P-UE for wireless communication may include a transceiver, a memory, and one or more processors coupled to the transceiver and the memory, configured to: transmit, to a network node, via the transceiver, a first set of ranging measurements based at least in part on a first one or more positioning reference signals communicated over a sidelink between the P-UE and a V-UE; transmit, to one or more base stations, via the transceiver, a second set of ranging measurements based at least in part on a second one or more positioning reference signals communicated over an access link between the P-UE and the one or more base stations; and receive, from the network node, via the transceiver, an estimated position of the P-UE, wherein the estimated position of the P-UE is based at least in part on the first set of ranging measurements and the second set of ranging measurements.

In some aspects, a non-transitory computer-readable medium may store a set of instructions for wireless communication. The set of instructions may include one or more instructions that, when executed by one or more processors of a network node, cause the network node to: receive a first set of ranging measurements based at least in part on a first one or more positioning reference signals communicated over a sidelink between a P-UE and a V-UE; receive a second set of ranging measurements based at least in part on a second one or more positioning reference signals communicated over an access link between the P-UE and one or more base stations; and transmit, to the P-UE, an estimated position of the P-UE, wherein the estimated position of the P-UE is based at least in part on the first set of ranging measurements and the second set of ranging measurements.

In some aspects, a non-transitory computer-readable medium may store a set of instructions for wireless communication. The set of instructions may include one or more instructions that, when executed by one or more processors of a P-UE, cause the P-UE to: transmit, to a network node, a first set of ranging measurements based at least in part on a first one or more positioning reference signals communicated over a sidelink between the P-UE and a V-UE; transmit, to one or more base stations, a second set of ranging measurements based at least in part on a second one or more positioning reference signals communicated over an access link between the P-UE and the one or more base stations; and receive, from the network node, an estimated position of the P-UE, wherein the estimated position of the P-UE is based at least in part on the first set of ranging measurements and the second set of ranging measurements.

In some aspects, an apparatus for wireless communication may include: means for receiving a first set of ranging measurements based at least in part on a first one or more positioning reference signals communicated over a sidelink between a P-UE and a V-UE; means for receiving a second set of ranging measurements based at least in part on a second one or more positioning reference signals communicated over an access link between the P-UE and one or more base stations; and means for transmitting, to the P-UE, an estimated position of the P-UE, wherein the estimated position of the P-UE is based at least in part on the first set of ranging measurements and the second set of ranging measurements.

In some aspects, an apparatus for wireless communication may include: means for transmitting, to a network node, a first set of ranging measurements based at least in part on a first one or more positioning reference signals communicated over a sidelink between the apparatus and a V-UE; means for transmitting, to one or more base stations, a second set of ranging measurements based at least in part on a second one or more positioning reference signals communicated over an access link between the apparatus and the one or more base stations; and means for receiving, from the network node, an estimated position of the apparatus, wherein the estimated position of the apparatus is based at least in part on the first set of ranging measurements and the second set of ranging measurements.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A-7D are diagrams illustrating examples associated with V2P positioning with UE and network assistance, in accordance with the present disclosure.

FIGS. 8-9 are diagrams illustrating example processes associated with V2P positioning with UE and network assistance, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
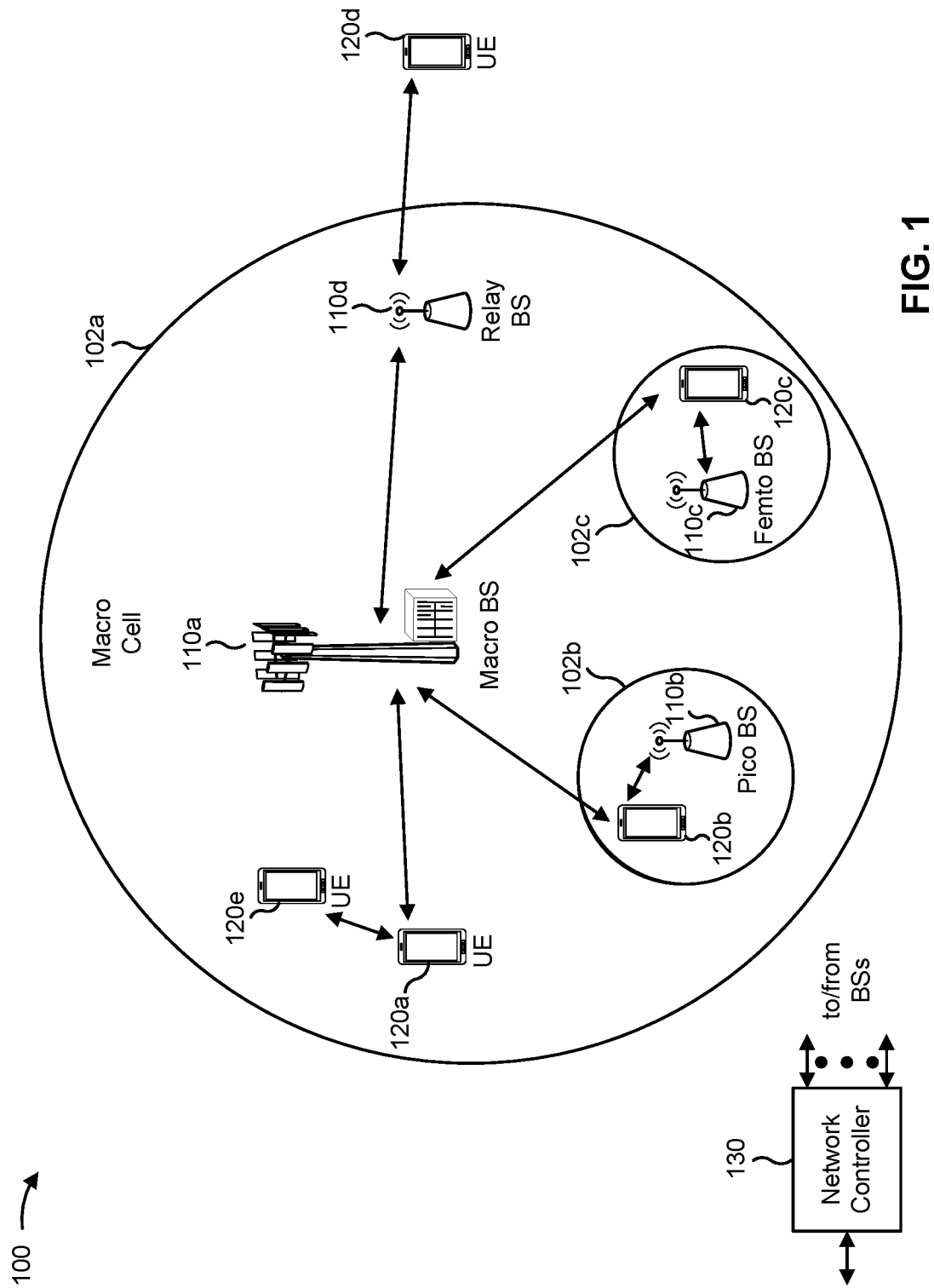
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul. In some aspects, wireless network 100 may include one or more network controllers 130. For example, wireless network 100 may include a network controller 130 that implements a location management function (LMF) device and/or the like. In some aspects, the LMF device may be included in a core network of wireless network 100 (e.g., a 5G/NR core network).

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-pedestrian (V2P) protocol, a vehicle-to-infrastructure (V2I) protocol, a vehicle-to-network (V2N) protocol, and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
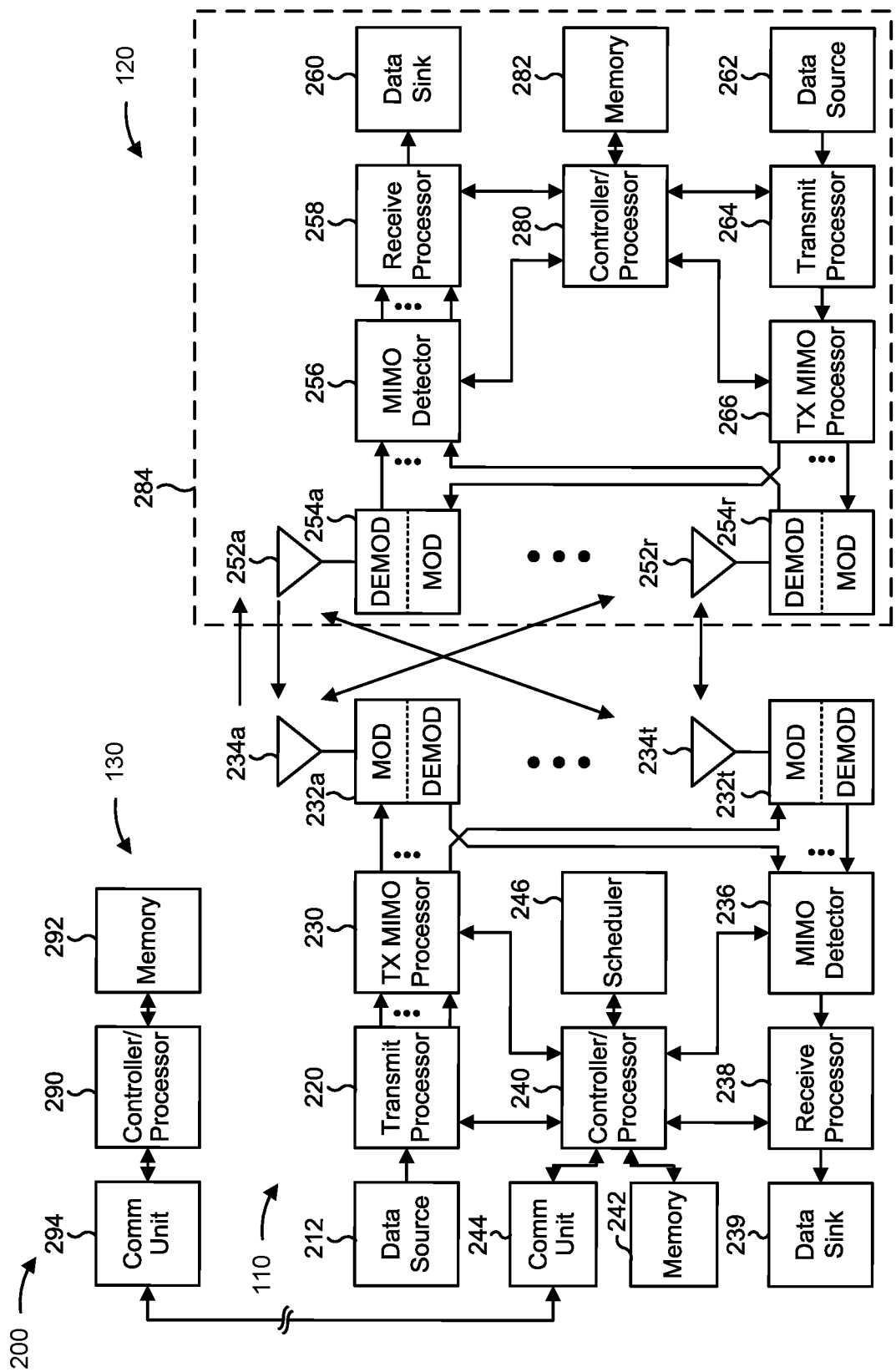
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (Tx) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a Tx MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or Tx MIMO processor 266. The transceiver may be used by a processor (e.g., controller/processor 280) and memory 282 to perform aspects of any of the methods described herein (for example, as described with reference to FIG. 6, FIGS. 7A-7D, FIG. 8, and/or FIG. 9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or Tx MIMO processor 230. The transceiver may be used by a processor (e.g., controller/processor 240) and memory 242 to perform aspects of any of the methods described herein (for example, as described with reference to FIG. 6, FIGS. 7A-7D, FIG. 8, and/or FIG. 9).

Controller/processor 240 of base station 110, controller/processor 280 of UE 120, controller/processor 290 of network controller 130, and/or any other component(s) of FIG. 2 may perform one or more techniques associated with vehicle-to-pedestrian (V2P) positioning with UE and network assistance, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include miming the instructions, converting the instructions, compiling the instructions, and/or interpreting the instructions, among other examples.

In some aspects, UE 120 may include means for transmitting, to a network node (e.g., base station 110, network controller 130, and/or the like), a first set of ranging measurements based at least in part on a first one or more positioning reference signals communicated over a sidelink between UE 120 and a vehicle UE (V-UE) 120, means for transmitting, to one or more base stations 110, a second set of ranging measurements based at least in part on a second one or more positioning reference signals communicated over an access link between UE 120 and the one or more base stations 110, means for receiving, from the network node, an estimated position of UE 120, wherein the estimated position of UE 120 is based at least in part on the first set of ranging measurements and the second set of ranging measurements, and/or the like. In some aspects, such means may include one or more components of UE 120 described in connection with FIG. 2, such as controller/processor 280, transmit processor 264, Tx MIMO processor 266, MOD 254, antenna 252, DEMOD 254, MIMO detector 256, receive processor 258, and/or the like.

In some aspects, base station 110 and/or network controller 130 may include means for receiving a first set of ranging measurements based at least in part on a first one or more positioning reference signals communicated over a sidelink between a pedestrian UE (P-UE) 120 and a V-UE 120, means for receiving a second set of ranging measurements based at least in part on a second one or more positioning reference signals communicated over an access link between the P-UE 120 and one or more base stations 110, means for transmitting, to the P-UE 120, an estimated position of the P-UE 120, wherein the estimated position of the P-UE 120 is based at least in part on the first set of ranging measurements and the second set of ranging measurements, and/or the like. In some aspects, such means may include one or more components of base station 110 described in connection with FIG. 2, such as antenna 234, DEMOD 232, MIMO detector 236, receive processor 238, controller/processor 240, transmit processor 220, Tx MIMO processor 230, MOD 232, antenna 234, and/or the like. Additionally, or alternatively, such means may include one or more components of network controller 130 described in connection with FIG. 2, such as controller/processor 290, memory 292, communication unit 294, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the Tx MIMO processor 266 may be performed by or under the control of controller/processor 280.

As indicated above, FIG. 2 is provided as an example. Other examples may differ from what is described with regard to FIG. 2.

Figure 3:
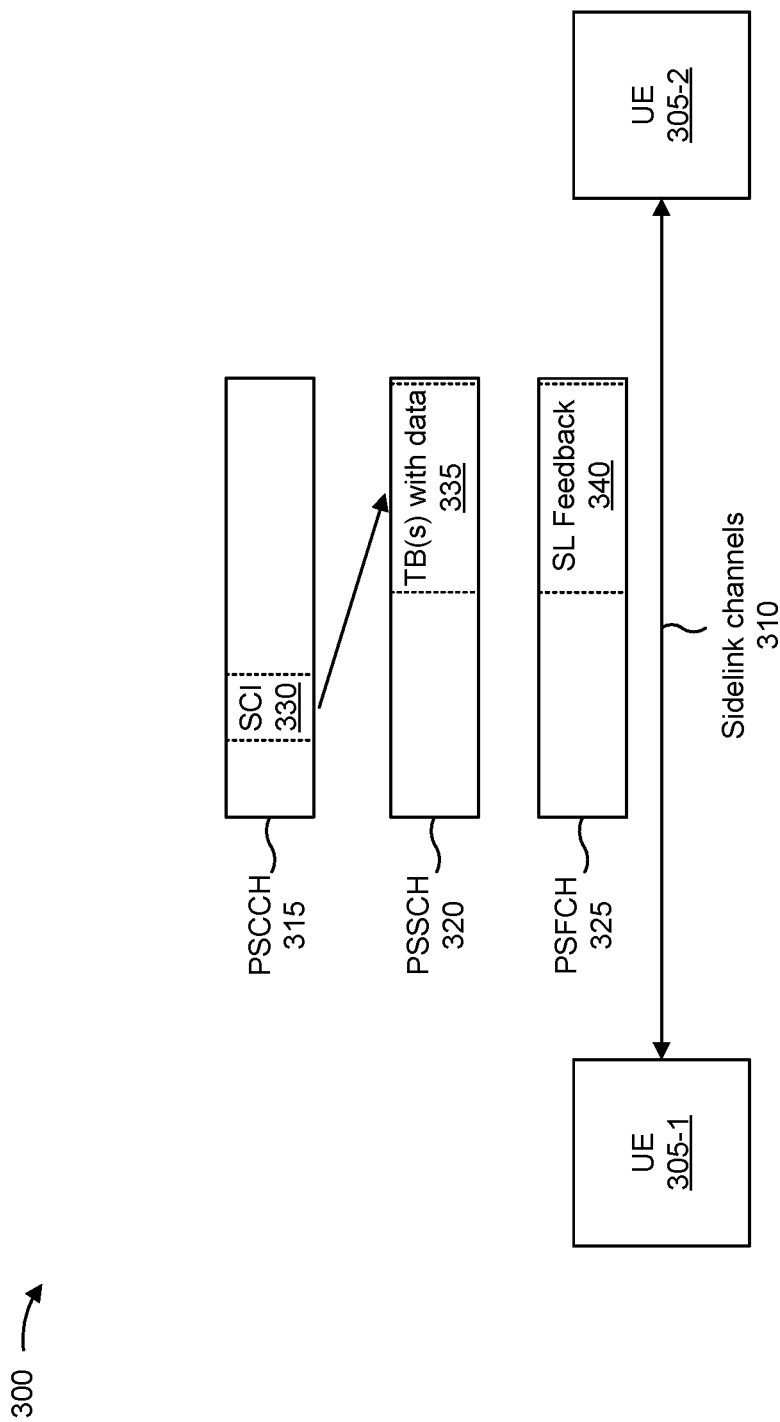
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2P communications, V2I communications, V2N communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
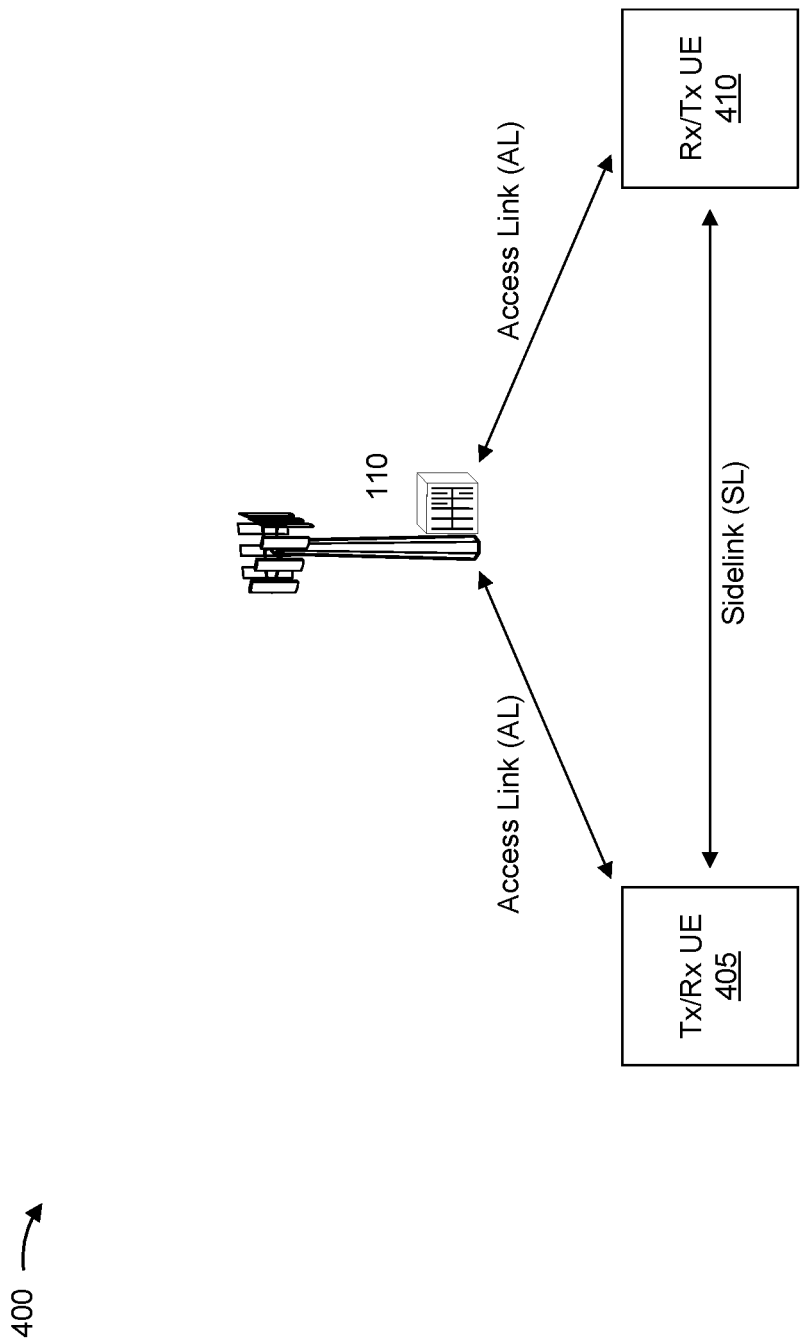
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
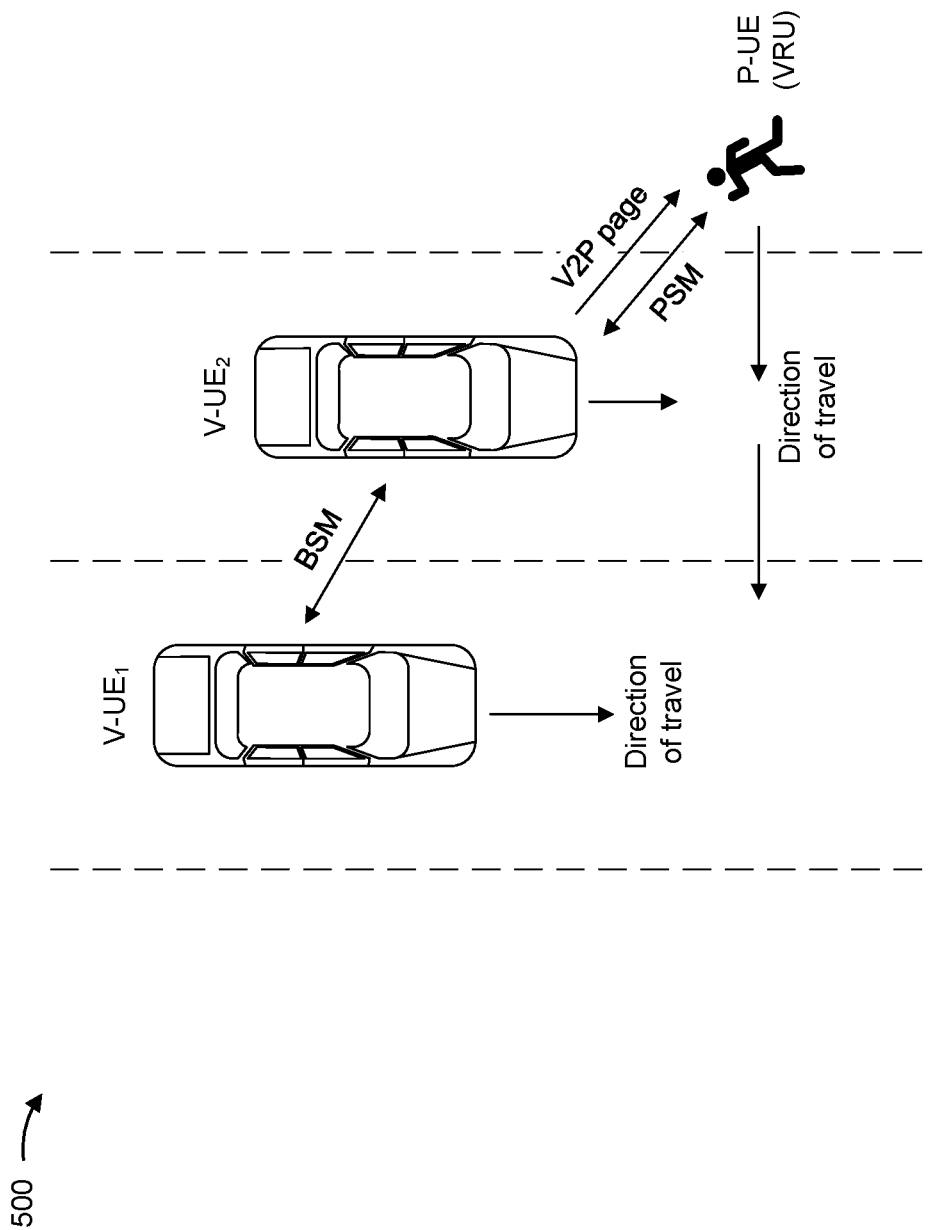
FIG. 5 is a diagram illustrating an example of vehicle-to-everything (V2X) communications, in accordance with the present disclosure.

FIG. 5 is a diagram illustrating an example 500 of V2X communications, in accordance with the present disclosure. In particular, V2X generally encompasses technologies that can be used to communicate information between a vehicle equipped with suitable communication capabilities, referred to herein as a vehicle UE (V-UE) and/or the like, and one or more other devices. For example, V2X communication may include vehicle-to-vehicle (V2V) communication technologies that allow V-UEs to communicate with one another (e.g., to support safety systems with non-line-of-sight and latency-sensitive collision avoidance capabilities), vehicle-to-pedestrian (V2P) communication technologies that allow V-UEs to communicate with pedestrian UEs (P-UEs) (e.g., smartphones, connected wearable devices, and/or the like), vehicle-to-infrastructure (V2I) communication technologies that allow V-UEs to communicate with external systems such as street lights, buildings, roadside units, and/or the like, vehicle-to-network (V2N) communication technologies that allow V-UEs to communicate with cellular networks, and/or the like. For example, in 3GPP Release 14, cellular V2X (C-V2X) was initially defined with LTE as an underlying radio access technology (RAT), and in 3GPP Release 15, C-V2X functionality was expanded to provide support for communication using NR as an enabling RAT.

Accordingly, in some cases, a V2X wireless communication system may support one or more protocols (e.g., V2V, V2P, V2I, V2N, and/or the like) that enable UEs to communicate with one another directly using device-to-device communication over a PC5 interface, also known as sidelink communication, without using a base station as an intermediary (e.g., in the 5.9 GHz spectrum dedicated to Intelligent Transport Systems (ITS)). Additionally, or alternatively, in some cases, a V2X wireless communication system may support one or more protocols (e.g., V2N) that enable UEs to communicate with a wireless wide area network (WWAN) and/or other devices in communication with the WWAN over a cellular (e.g., Uu) interface (e.g., over a licensed spectrum and/or an unlicensed spectrum).

In V2X communication systems, one challenge that may arise is that conditions of the sidelink, uplink, downlink, and/or other suitable communication channels used to carry V2X communications can vary widely and change quickly. For example, channel conditions may vary due to the high mobility of V-UEs, P-UEs, and/or the like, large variations in vehicle traffic at different times of day and/or in different locations, wide variation in topographies that the vehicles may traverse (e.g., dense urban environments, hilly environments, flat environments, and/or the like), and/or the like. Furthermore, V2X communication systems need to be highly reliable due to mission critical safety issues associated with, for example, autonomous vehicles and protecting vulnerable road users (VRUs), which may generally refer to pedestrians, cyclists, motorcyclists, and/or other road users that have little or no protection that would absorb energy in a collision. Accordingly, because road safety is an important concern, V2X environments generally need to have highly accurate positioning mechanisms to enable devices to inform other devices about safety risks, such as a P-UE on a potential collision course.

For example, FIG. 5 illustrates an example scenario with two V-UEs (shown as V-UE$_1$ and V-UE$_2$) traveling in the same direction on different lanes of a roadway. As shown in FIG. 5, the V-UEs may engage in V2V communication, which may include periodically transmitting a basic safety message (BSM) that contains safety data regarding a vehicle state. For example, a BSM transmitted by a V-UE may include safety data such as a global navigation satellite system (GNSS) position (e.g., latitude, longitude, elevation), a position accuracy, a speed, an acceleration, a heading, a yaw rate, a steering wheel angle, a brake system status, a vehicle size (e.g., width and length), and/or the like. Accordingly, V-UEs may periodically exchange BSMs to provide a driver and/or an autonomous driving module with the position, speed, direction, and/or other information associated with nearby vehicles to avoid potential collisions. Furthermore, in a V2P communication system, a V-UE may need to know a position of the associated vehicle as well as data related to the position and/or movement of a P-UE in order to avoid a potential collision with a VRU carrying the P-UE. For example, as shown in FIG. 5, a P-UE may be configured to periodically broadcast a personal safety message (PSM) that contains kinematic state information for the associated VRU, such as GNSS position, position accuracy, speed, heading, and/or the like. In this way, when a V-UE detects that the V-UE is traveling on a potential collision course with a P-UE, the V-UE may transmit a paging message (e.g., a V2P page) to a P-UE to alert the VRU in an effort to prevent the collision.

In general, avoiding collisions in a V2P environment is dependent on V-UEs and P-UEs having accurate self-positioning information as well as accurate positioning information regarding nearby devices (e.g., as indicated in a BSM, a PSM, and/or the like). However, the positioning data available to a V-UE typically has a much higher accuracy than the positioning data available to a P-UE. For example, a V-UE is typically equipped with various high-quality, expensive sensors that are factored into the substantial cost of a vehicle, whereas a P-UE is typically a consumer electronic device that is equipped with comparatively low-quality sensors. As a result, the positioning data that a P-UE indicates in a PSM may be far less reliable than the positioning data that a V-UE indicates in a BSM. For example, in order to satisfy a minimum relative positioning requirement for collision warning applications, the position data included in a BSM is required to meet a lane-level accuracy (e.g., 0.5 meters or better). In contrast, the positioning data available to a P-UE tends to have significant measurement noise that reduces the accuracy (and reliability) of the P-UE position estimate. For example, when a P-UE is located in an urban area, behind a building, or in another area where there is a lack of open space, errors in the P-UE position estimate can approach a few tens of meters, which is problematic in collision warning applications.

Some aspects described herein relate to techniques and apparatuses to perform V2P positioning with UE and network assistance. For example, a P-UE may communicate with one or more V-UEs on a sidelink to perform ranging and positioning related measurements (e.g., based on positioning reference signals (PRSs) communicated over the sidelink between the P-UE and the V-UEs), and the P-UE may further receive a BSM that contains positioning data, kinematic data, and/or the like from each V-UE. Accordingly, the P-UE may report one or more ranging measurements associated with the PRSs communicated over the sidelink to a network node, such as a location management function (LMF) device, over an access link. The network node may schedule one or more PRS measurement sessions for the P-UE, for example, with a base station that provides a serving cell for the P-UE, one or more base stations that provide neighboring cells for the P-UE, and/or the like. Accordingly, the one or more base stations may report additional ranging measurements for the P-UE to the network node, which may determine an estimated position of the P-UE using the sidelink ranging measurements, the access link ranging measurements, the position(s) of the V-UE(s), and/or the like. In this way, the network node may determine an accurate position estimate for the P-UE based at least in part on global data related to ranging and/or positioning measurement sessions that various P-UEs perform with V-UEs on a sidelink and/or with different base stations on an access link.

As indicated above, FIG. 5 is provided as an example. Other examples may differ from what is described with respect to FIG. 5.

Figure 6:
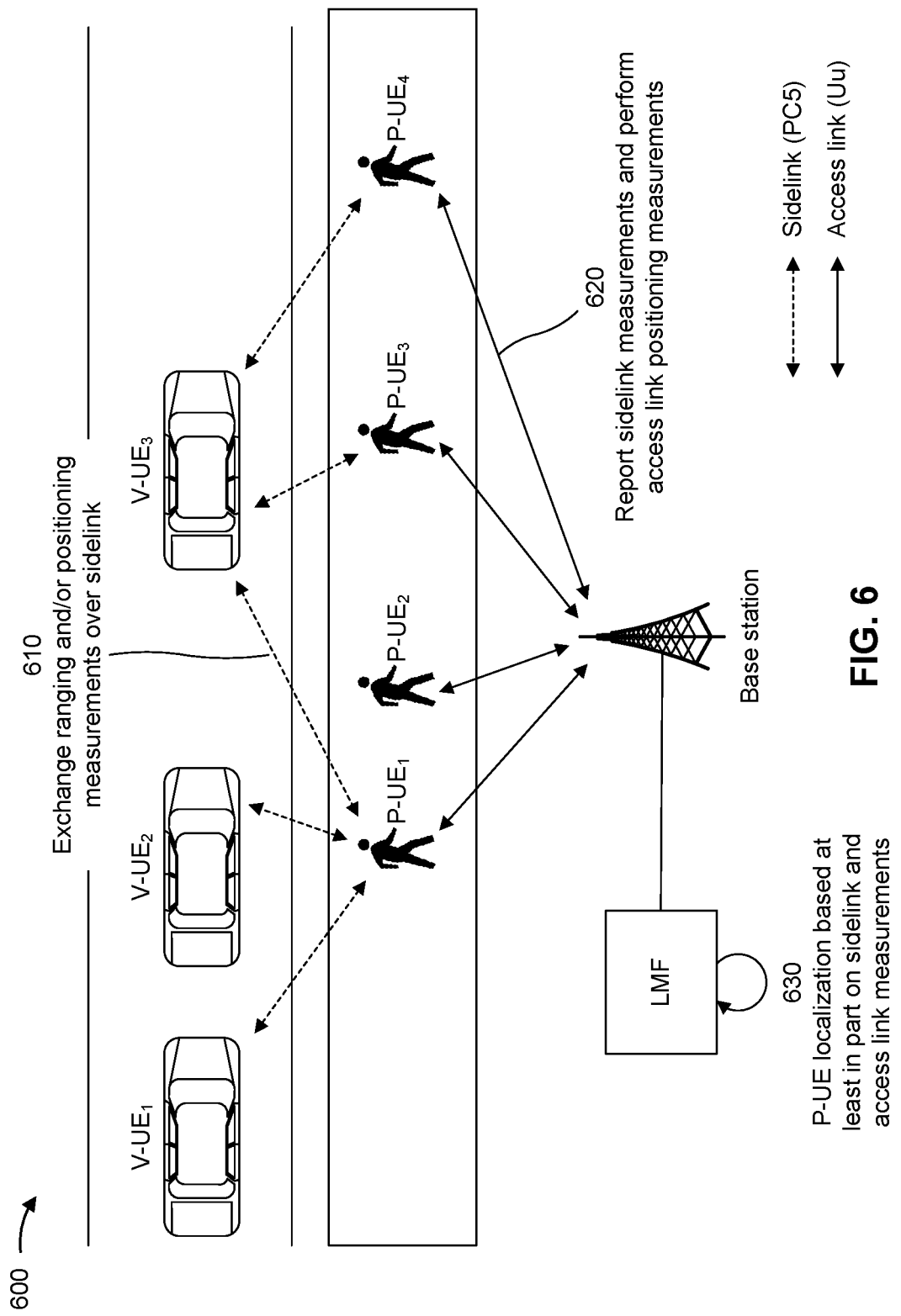
FIG. 6 is a diagram illustrating an example associated with vehicle-to-pedestrian (V2P) positioning with UE and network assistance, in accordance with the present disclosure.

FIG. 6 is a diagram illustrating an example 600 associated with V2P positioning with UE and network assistance, in accordance with the present disclosure. As shown in FIG. 6, example 600 includes one or more P-UEs (shown as P-UE$_1$ through P-UE$_4$) that communicate with one or more V-UEs (shown as V-UE$_1$ through V-UE$_3$) on a sidelink and with one or more base stations on an access link. As further shown in FIG. 6, example 600 includes a network node, such as an LMF device, that supports location determination for the P-UEs.

As shown in FIG. 6, and by reference number 610, one or more P-UEs may exchange ranging and/or positioning measurements with one or more V-UEs over a sidelink. For example, a V-UE may initiate a positioning request with a P-UE over the sidelink, or the P-UE may initiate the positioning request with the V-UE. The V-UE and the P-UE may exchange respective positioning capabilities, and may perform a ranging and/or positioning measurement session according to the respective positioning capabilities. For example, in some aspects, a V-UE may transmit one or more PRSs to the P-UE to enable the P-UE to measure one or more ranging parameters.

For example, as described herein, a PRS transmitted by a V-UE, a base station, and/or the like may carry information used to enable timing or ranging measurements of the P-UE based on signals transmitted by the V-UE, the base station, and/or the like in order to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PSCCH, a PDCCH, and/or the like). In general, a PRS transmitted by a V-UE, a base station, and/or the like may be designed to improve detectability of the PRS by the P-UE, which may need to detect signals from multiple neighboring devices (e.g., neighboring V-UEs, neighboring base stations, and/or the like) in order to perform OTDOA-based positioning. Accordingly, as described herein, a P-UE may receive a PRS from one or more V-UEs, and may determine one or more ranging measurements, such as a reference signal time difference (RSTD), a time difference of arrival (TDOA) measurement, an angle of arrival (AoA), a clock bias error, a round trip time (RTT), and/or the like for the PRS(s) transmitted by one or more V-UEs. Furthermore, in some aspects, the P-UE may receive a BSM from each V-UE that participates in a ranging and/or positioning measurement session with the P-UE. In this way, the P-UE may obtain various ranging measurements from the PRSs that are communicated over the sidelink, and may further determine the estimated position of each V-UE that participates in a ranging and/or positioning measurement session with the P-UE. Additionally, or alternatively, the P-UE may infer the position of one or more of the V-UEs participating in the ranging and/or positioning measurement sessions from the BSM messages transmitted by the V-UE(s), or the V-UE(s) may explicitly indicate the position(s) of the V-UE(s) during the sidelink PRS measurement session with the P-UE.

As further shown in FIG. 6, and by reference number 620, one or more P-UEs may transmit, to the network node (e.g., via a serving base station), information to report ranging and/or positioning measurements obtained in one or more ranging and/or positioning measurement sessions with one or more V-UEs. For example, in some aspects, the ranging and/or positioning measurements may include ego (self) measurements based at least in part on the PRSs transmitted by the one or more V-UEs (e.g., RSTD measurements, TDOA measurements, AoA measurements, clock bias error measurements, RTT measurements, and/or the like), and the ranging and/or positioning measurements may further include estimated positions and/or other kinematic data indicated in the BSM(s) received from the V-UE(s). Furthermore, in some aspects, the P-UEs may perform one or more access link positioning measurements based at least in part on PRSs transmitted by one or more base stations (e.g., a serving base station and one or more neighboring base stations). Accordingly, the base station(s) communicating with the P-UEs may provide the sidelink and access link ranging and positioning measurements to the network node (e.g., the LMF device) that supports localization functions for the P-UEs.

As further shown in FIG. 6, and by reference number 630, the network node (e.g., the LMF device) may localize one or more P-UEs based at least in part on the sidelink and access link ranging and/or positioning measurements. For example, the network node may determine estimated positions of the P-UEs based at least in part on the estimated positions of the V-UEs and the ranging measurements that are based on the PRSs communicated over the sidelink between the P-UEs and the V-UEs, and the network node may further determine or refine the estimated positions of the P-UEs based at least in part on known positions of the base stations and the ranging measurements that are based on the PRSs communicated over the access link between the P-UEs and the base stations. Furthermore, because ranging and/or positioning measurements may be aggregated at the network node from various P-UEs that participate in ranging and/or positioning measurement sessions with different V-UEs and/or base stations, the network node may have global knowledge related to estimated positions and ranging measurements associated with different permutations of P-UEs, V-UEs, and base stations. In this way, the network node may determine an accurate position estimate for each P-UE, and may provide the position estimate to the corresponding P-UE (e.g., based on an on-demand request, at periodic intervals, based on an occurrence of a triggering event, and/or the like).

As indicated above, FIG. 6 is provided as an example. Other examples may differ from what is described with respect to FIG. 6.

FIGS. 7A-7D are diagrams illustrating one or more examples 700 associated with V2P positioning with UE and network assistance, in accordance with the present disclosure. As shown in FIGS. 7A-7D, example(s) 700 includes a P-UE that may communicate with one or more V-UEs on a sidelink, one or more base stations that may communicate with the P-UE on an access link, and a network node (shown as an LMF device) that supports location determination for the P-UEs. For example, the network node may be included in a core network of a wireless network (e.g., a 5G/NR core network of wireless network 100), and may communicate with the base station(s) over a backhaul interface, with the P-UE via the base station(s).

Figure 7A:
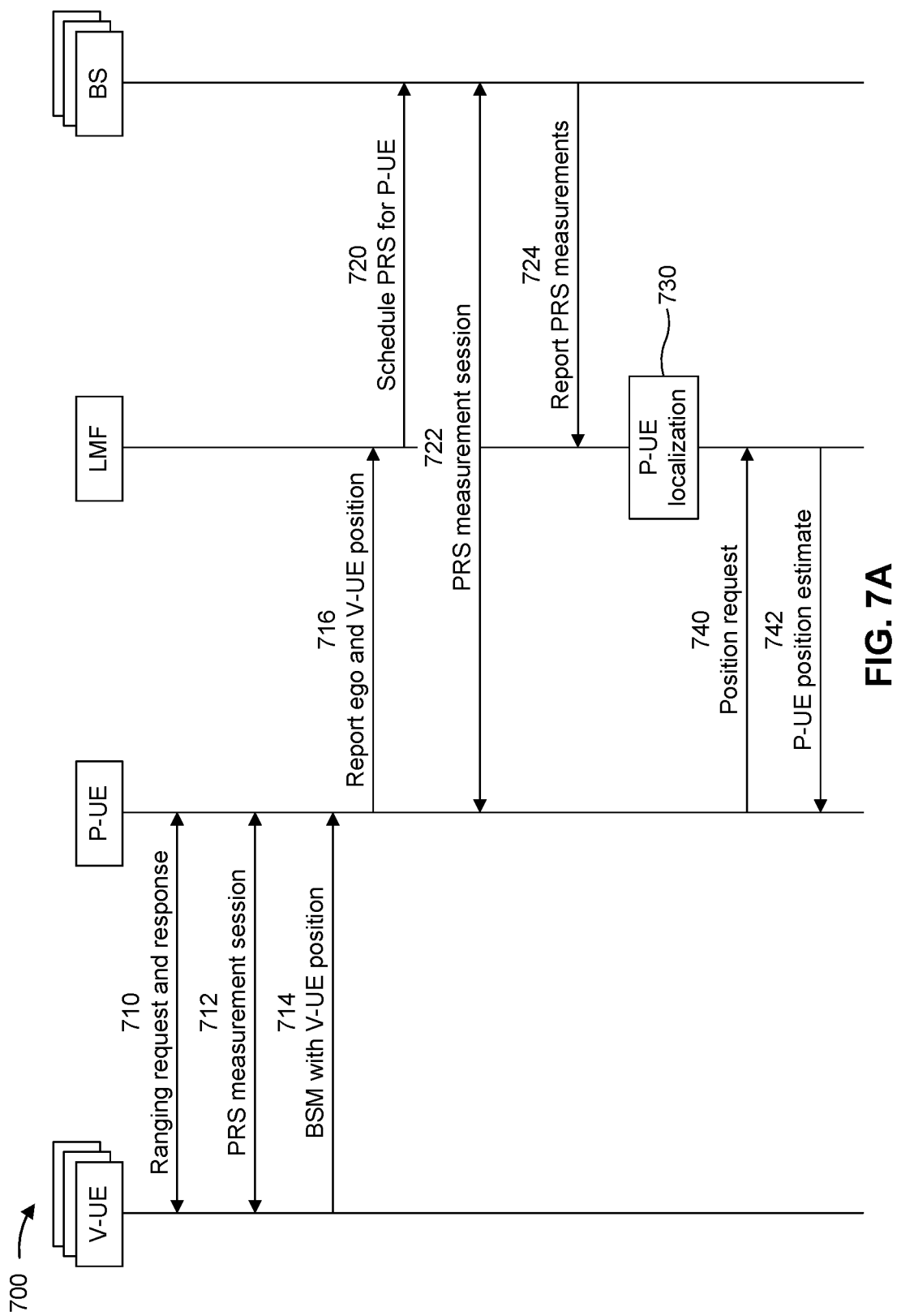

As shown in FIG. 7A, and by reference number 710, the P-UE may exchange ranging request and response messages with one or more V-UEs over a sidelink. For example, in some aspects, the P-UE may transmit a ranging request message to a V-UE, or a V-UE may transmit a ranging request message to the P-UE, to initiate a ranging and/or positioning measurement session. In some aspects, the ranging request message may indicate positioning capabilities associated with the initiating device. Furthermore, a ranging request response message may indicate whether a responding device (e.g., the P-UE or a V-UE) is able to participate in a ranging and/or positioning measurement session, and may further indicate positioning capabilities associated with the responding device in cases where the responding device is able to participate in a ranging and/or positioning measurement session. For example, in some aspects, the positioning capabilities may be used to configure one or more PRSs that are transmitted over the sidelink to enable the V-UE to range the P-UE, and to enable the P-UE to obtain ranging measurements that can be provided to the network node to determine the estimated position of the P-UE.

As further shown in FIG. 7A, and by reference number 712, the P-UE may engage in a PRS measurement session with one or more V-UEs. For example, in a PRS measurement session, a V-UE may transmit a PRS to the P-UE over the sidelink, and the P-UE may obtain a set of ranging measurements based at least in part on the PRS transmitted by the V-UE. For example, as described above, the set of ranging measurements may include an AoA measurement, a clock bias error measurement, an RTT measurement, a time of arrival (ToA) measurement, and/or the like. Furthermore, in cases where the P-UE participates in a PRS measurement session with multiple V-UEs, the set of ranging measurements may include a TDOA measurement, an OTDOA measurement, an RSTD measurement, and/or the like. Accordingly, as described herein, the V-UEs may generally act as anchors for the PRS measurement sessions with the P-UE, to enable the P-UE to obtain ranging measurements that may indicate distances from the P-UE to the one or more V-UEs.

As further shown in FIG. 7A, and by reference number 714, the P-UE may receive a BSM from each of the one or more V-UEs that engage in a ranging and/or positioning measurement session with the P-UE. For example, in some aspects, a BSM may generally include at least an estimated position of a V-UE that transmitted the BSM. Furthermore, in some aspects, the BSM may include additional safety data regarding a V-UE state. For example, in some aspects, the BSM transmitted by a V-UE may include a position accuracy, a speed, an acceleration, a heading, a yaw rate, a steering wheel angle, a brake system status, a vehicle size, and/or other information associated with the V-UE.

As further shown in FIG. 7A, and by reference number 716, the P-UE may transmit, to the network node (e.g., via a serving base station), information to report ego measurements (or self-measurements) obtained during one or more PRS measurement sessions with one or more V-UEs and the estimated position(s) of the V-UE(s) (e.g., as indicated in the BSM transmitted by each V-UE). For example, in some aspects, the ego measurements may generally include a set of ranging measurements obtained by the P-UE based at least in part on the PRSs communicated between the V-UE(s) and the P-UE over the sidelink (e.g., measurements related to a ToA, an AoA, a clock bias error, an RTT, a TDOA, and/or the like). In this way, the estimated position(s) of the V-UE(s) and the ranging measurements that indicate respective distances between the P-UE and the V-UE(s) may enable the network node to determine an estimated position of the P-UE. Furthermore, in some aspects, the P-UE may perform ranging and/or positioning measurements with nearby V-UEs and report ranging measurements and V-UE positions to the network node on a periodic or ongoing basis. For example, in some cases, the P-UE may not need to request positioning assistance from the network node in cases where the P-UE is able to obtain a reliable position estimate from the ranging measurements and estimated V-UE positions. However, in cases where there is significant variance in the P-UE position estimate based on ranging measurements obtained from PRSs transmitted by different V-UEs, the P-UE may request the assistance of the network node to obtain a more reliable position estimate. Accordingly, as described herein, the P-UE may transmit the ranging measurements and V-UE position estimates to the network node to enable the network node to provide positioning assistance on-demand, on a periodic basis, upon occurrence of a triggering event, and/or the like, as described in further detail below.

As further shown in FIG. 7A, and by reference number 720, the network node may communicate with one or more base stations to schedule PRS transmission for the P-UE. For example, in some aspects, the network node may identify a base station that provides a serving cell for the P-UE, may identify one or more base stations that provide neighboring cells for the P-UE, and may schedule PRS transmission from the identified base stations to the P-UE.

As further shown in FIG. 7A, and by reference number 722, the P-UE may engage in a PRS measurement session with the one or more base stations. For example, in a similar manner as the sidelink PRS measurement sessions, each base station that is scheduled for PRS transmission may transmit a PRS to the P-UE over an access link, and the P-UE may obtain a set of ranging measurements based at least in part on the PRS transmitted by each base station. For example, as described above, the set of ranging measurements may include an AoA measurement, a clock bias error measurement, an RTT measurement, a ToA measurement, a TDOA measurement, an OTDOA measurement, an RSTD measurement, and/or the like. Accordingly, as described herein, the base stations may act as anchors for the access link PRS measurement sessions with the P-UE to enable the P-UE to obtain ranging measurements that may indicate distances from the P-UE to each base station.

As further shown in FIG. 7A, and by reference number 724, each base station that performs PRS measurements with the P-UE over the access link may report the ranging measurements associated with the PRS measurements to the network node. For example, the P-UE may report AoA, clock bias error, RTT, ToA, TDOA, OTDOA, RSTD, and/or other ranging measurement values to the base stations, and the base stations may relay the ranging measurements to the network node.

As further shown in FIG. 7A, and by reference number 730, the network node may perform localization functions to determine a position estimate for the P-UE based at least in part on the ranging measurements associated with the sidelink PRS measurement sessions, the estimated positions of the V-UEs that participated in the sidelink PRS measurement sessions, the ranging measurements associated with the access link PRS measurement sessions, and positions of the base stations that participated in the sidelink PRS measurement sessions. Furthermore, the network node may receive ranging measurements from multiple P-UEs that participate in sidelink PRS measurement sessions with different V-UEs, and from multiple base stations that participate in access link PRS measurement sessions with different P-UEs. Accordingly, in some aspects, the network node may rely upon positioning data from various different sources to determine the position estimate for the P-UE. For example, based at least in part on the ranging measurements obtained over the sidelink between the P-UE and one or more V-UEs, and the ranging measurements obtained over the access link between the P-UE and one or more base stations, the network node may be able to determine an accurate and reliable position estimate for the P-UE. Furthermore, the accuracy and reliability of the position estimate for the P-UE may be improved in cases where the network node receives ranging measurements based on sidelink PRS measurements and/or access link PRS measurements from other P-UEs that may be communicating with the same (or other) V-UEs and/or base stations.

As further shown in FIG. 7A, and by reference number 740, the P-UE may transmit a position request to the network node. For example, in some aspects, the position request transmitted by the P-UE may indicate one or more modes by which the network node is to provide a position estimate to the P-UE. For example, as described in further detail below with reference to FIG. 7B, the position request transmitted by the P-UE may be an on-demand position request in which the P-UE requests information related to the estimated position of the P-UE and/or one or more V-UEs. Additionally, or alternatively, as described in further detail below with reference to FIG. 7C, the position request transmitted by the P-UE may configure one or more event triggers that define conditions in which the network node is to report the estimated position of the P-UE and/or one or more V-UEs to the P-UE. Additionally, or alternatively, as described in further detail below with reference to FIG. 7D, the position request transmitted by the P-UE may configure a periodic interval for reporting position information such that the network node is to report the estimated position of the P-UE and/or one or more V-UEs to the P-UE after the periodic interval expires.

As further shown in FIG. 7A, and by reference number 742, the network node may transmit one or more position estimates to the P-UE. For example, in some aspects, the one or more position estimates transmitted to the P-UE may include at least a position estimate of the P-UE. Furthermore, in some aspects, the one or more position estimates transmitted to the P-UE may include position estimates for one or more V-UEs. For example, as described in further detail below with reference to FIG. 7B, the position estimate(s) may be transmitted to the P-UE responsive to an on-demand position request from the P-UE. Additionally, or alternatively, as described in further detail below with reference to FIG. 7C, the position estimate(s) may be transmitted to the P-UE based at least in part on the network node detecting an occurrence of one or more triggering events. Additionally, or alternatively, as described in further detail below with reference to FIG. 7D, the position estimate(s) may be transmitted to the P-UE upon determining that a periodic interval configured by the P-UE has expired.

For example, as shown in FIG. 7B, and by reference number 750, the P-UE may transmit, to the network node, an on-demand request for an estimated position of the P-UE and/or an estimated position of one or more V-UEs. For example, in some aspects, the P-UE may transmit the on-demand request to the network node to request positioning assistance based at least in part on determining that the estimated position of the P-UE, as determined by the P-UE, is unreliable (e.g., based at least in part on a variance in GNSS sensor information satisfying a threshold, a variance in ranging measurements with one or more V-UEs satisfying a threshold, and/or the like). Additionally, or alternatively, the P-UE may transmit the on-demand request based at least in part on detecting a presence of one or more V-UEs (e.g., through BSM transmissions received at the P-UE). In some aspects, when the P-UE requests positioning information associated with one or more V-UEs, the on-demand request may include identifiers associated with the one or more V-UEs to enable the network node to determine the V-UEs for which the P-UE requested positioning information.

Accordingly, as described herein, the P-UE may transmit the on-demand positioning request to the network node to request an estimated position of the P-UE in cases where the P-UE is unable to determine a reliable position estimate for the P-UE. Similarly, the P-UE may request estimated positions of one or more V-UEs in cases where the P-UE is unable to determine reliable position estimates for the V-UEs (e.g., due to a variance in ranging measurements obtained from PRS transmissions by such V-UEs satisfying a threshold). As further shown in FIG. 7A, and by reference number 752, the network node may transmit, to the P-UE, a joint position estimate for the P-UE based at least in part on the sidelink and access link ranging measurements reported by the P-UE. Furthermore, in some cases, the joint position estimate may take into consideration sidelink and access link ranging measurements reported by other P-UEs to improve accuracy of the P-UE position estimate. Furthermore, in cases where the P-UE requests position estimates for one or more V-UEs that the P-UE is unable to accurately localize, the position estimate(s) that the network node returns for the V-UE(s) may be based on sidelink ranging measurements reported by other P-UEs (e.g., because the on-demand request indicates that the sidelink ranging measurements reported by the P-UE for the one or more V-UEs are deemed unreliable).

Additionally, or alternatively, as shown in FIG. 7C, and by reference number 760, the P-UE may transmit, to the network node, a positioning request that configures one or more triggering events that define conditions for reporting positioning information to the P-UE. Accordingly, as shown by reference number 762, the network node may transmit, to the P-UE, an estimated position of the P-UE and/or one or more V-UEs based at least in part on detecting an occurrence of the one or more triggering events. For example, in some aspects, one or more triggering events may be preconfigured, and the P-UE may transmit the positioning request in an uplink signaling message (e.g., a radio resource control (RRC) configuration message, a medium access control (MAC) control element (MAC-CE), uplink control information (UCI), and/or the like) to request that the network node enable one or more of the triggering events. Additionally, or alternatively, the positioning request may specify one or more conditions or criteria to define the triggering events.

In one use case, the triggering events may include a variance in measurements reported by a P-UE regarding the P-UE or a V-UE satisfying a threshold. For example, where a variance between one or more parameters included in the sidelink ranging measurements reported by the P-UE and one or more corresponding parameters included in the access link ranging measurements reported by a base station satisfies a threshold, the network node may localize the P-UE based on positioning data reported by various P-UEs and/or base stations and report the estimated position of the P-UE. In another example, the triggering events may include the P-UE initially reporting measurements about the P-UE and/or one or more V-UEs, in which case the network node may report the estimated position of the P-UE and/or the one or more V-UEs for a configured duration (e.g., to assist with initializing a position measurement for the P-UE). In still another example, the triggering events may include a distance between the P-UE and one or more V-UEs satisfying (e.g., being less than or equal to) a threshold, in which case the network node may transmit a warning message to alert the P-UE (e.g., to assist with avoiding a collision between the P-UE and the V-UEs that are within a threshold distance from the P-UE).

Figure 7D:
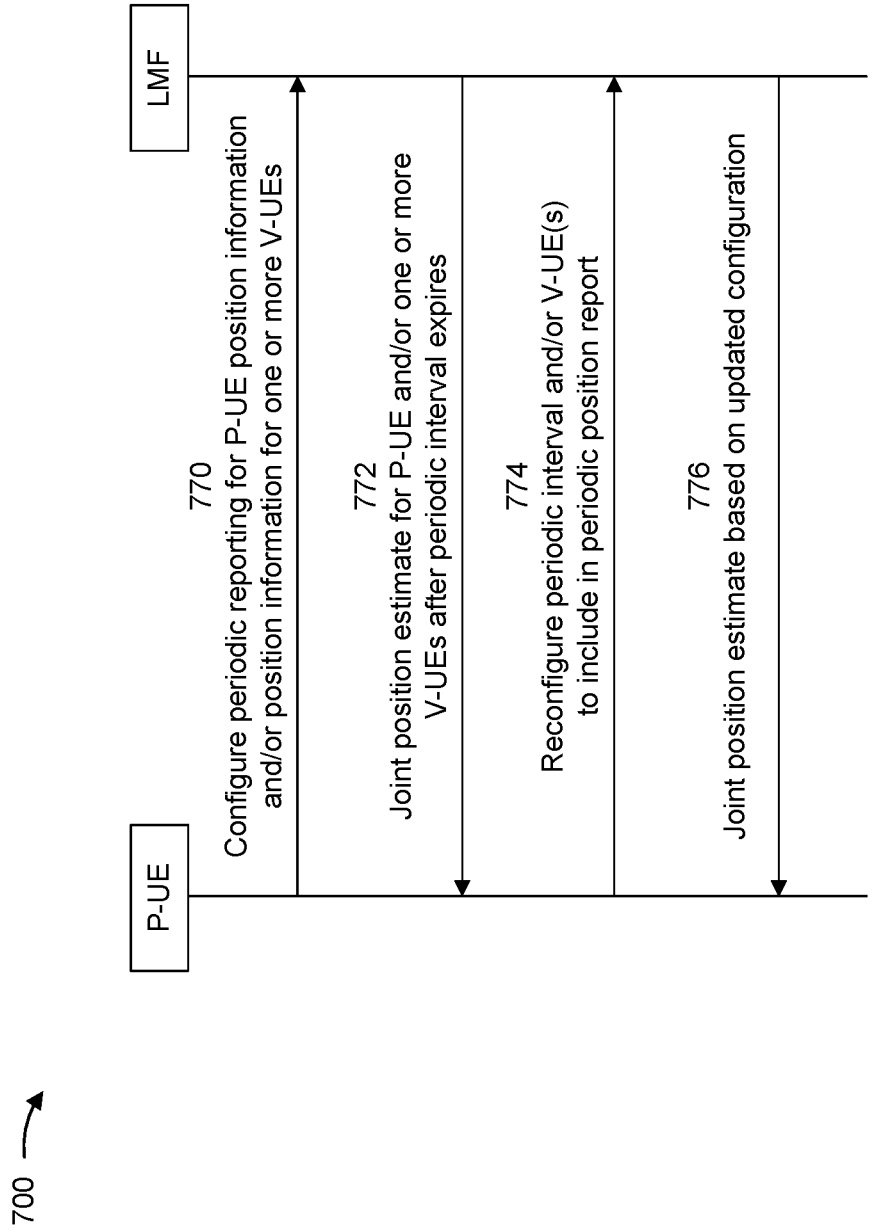

Additionally, or alternatively, as shown in FIG. 7D, and by reference number 770, the P-UE may transmit, to the network node, a positioning request that configures periodic reporting of estimated position information for the P-UE and/or one or more V-UEs. For example, in some aspects, the P-UE may configure the periodic reporting interval to request positioning assistance based at least in part on determining that the estimated position of the P-UE, as determined by the P-UE, is unreliable (e.g., based at least in part on a variance in GNSS sensor information satisfying a threshold, a variance in ranging measurements with one or more V-UEs satisfying a threshold, and/or the like). Additionally, or alternatively, the P-UE may configure the periodic reporting interval based at least in part on detecting a presence of one or more V-UEs (e.g., through BSM transmissions received at the P-UE). In some aspects, when the P-UE configures the periodic reporting interval, the on-demand request may include identifiers associated with the one or more V-UEs to enable the network node to determine the V-UEs for which the P-UE requested positioning information, and the P-UE may further indicate a duration for the periodic reporting interval. For example, the P-UE may configure the network node to report the estimated position of the P-UE and/or the one or more V-UEs every T seconds.

Accordingly, as described herein, the P-UE may transmit the positioning request to configure the periodic reporting interval in cases where the P-UE is unable to determine a reliable position estimate for the P-UE, in cases where the P-UE is unable to determine reliable position estimates for the V-UEs (e.g., due to a variance in ranging measurements obtained from PRS transmissions by such V-UEs satisfying a threshold), in cases where the P-UE detects one or more V-UEs, and/or the like. As further shown in FIG. 7D, and by reference number 772, the network node may transmit, to the P-UE, a joint position estimate for the P-UE based at least in part on the sidelink and access link ranging measurements reported by the P-UE after the periodic reporting interval has expired (e.g., every T seconds). Furthermore, in some cases, the joint position estimate may take into consideration sidelink and access link ranging measurements reported by other P-UEs to improve accuracy of the P-UE position estimate. Furthermore, in cases where the P-UE requests position estimates for one or more V-UEs that the P-UE is unable to accurately localize, the position estimate(s) that the network node returns for the V-UE(s) may be based on sidelink ranging measurements reported by other P-UEs (e.g., because the positioning request indicates that the position estimates provided in the BSM received from the one or more V-UEs are deemed unreliable).

As further shown in FIG. 7D, and by reference number 774, the P-UE may transmit a request to the network node in order to reconfigure the periodic reporting interval and/or to reconfigure the identity of the V-UE(s) to be included in the positioning information periodically reported to the P-UE. Accordingly, as further shown in FIG. 7D, and by reference number 776, the network may transmit, to the P-UE, a joint position estimate for the P-UE and/or one or more V-UEs according to the updated configuration information (e.g., after expiration of a periodic interval indicated in the reconfiguration request, to include position estimates for one or more V-UEs identified in the reconfiguration request, and/or the like).

As indicated above, FIGS. 7A-7D are provided as examples. Other examples may differ from what is described with respect to FIGS. 7A-7D.

FIG. 8 is a diagram illustrating an example process 800 performed, for example, by a network node, in accordance with the present disclosure. Example process 800 is an example where the network node (e.g., base station 110, network controller 130, LMF device, and/or the like) performs operations associated with V2P positioning with UE and network assistance.

As shown in FIG. 8, in some aspects, process 800 may include receiving a first set of ranging measurements based at least in part on one or more PRSs communicated over a sidelink between a P-UE and a V-UE (block 810). For example, the network node may receive (e.g., using communication unit 294, antenna 234, DEMOD 232, MIMO detector 236, receive processor 238, controller/processor 240, memory 242, and/or the like) a first set of ranging measurements based at least in part on one or more PRSs communicated over a sidelink between a P-UE and a V-UE, as described above.

As further shown in FIG. 8, in some aspects, process 800 may include receiving a second set of ranging measurements based at least in part on one or more PRSs communicated over an access link between the P-UE and one or more base stations (block 820). For example, the network node may receive (e.g., using communication unit 294, antenna 234, DEMOD 232, MIMO detector 236, receive processor 238, controller/processor 240, memory 242, and/or the like) a second set of ranging measurements based at least in part on one or more PRSs communicated over an access link between the P-UE and one or more base stations, as described above.

As further shown in FIG. 8, in some aspects, process 800 may include transmitting, to the P-UE, an estimated position of the P-UE, wherein the estimated position of the P-UE is based at least in part on the first set of ranging measurements and the second set of ranging measurements (block 830). For example, the network node may transmit (e.g., using communication unit 294, controller/processor 240, transmit processor 220, Tx MIMO processor 230, MOD 232, antenna 234, memory 242, and/or the like), to the P-UE, an estimated position of the P-UE, as described above. In some aspects, the estimated position of the P-UE is based at least in part on the first set of ranging measurements and the second set of ranging measurements.

Process 800 may include additional aspects, such as any single aspect or any combination of aspects described below and/or in connection with one or more other processes described elsewhere herein.

In a first aspect, process 800 includes determining a first position estimate for the P-UE based at least in part on the first set of ranging measurements and an estimated position of the V-UE, and determining a second position estimate for the P-UE based at least in part on the second set of ranging measurements and positions of the one or more base stations, wherein the estimated position of the P-UE is based at least in part on the first position estimate and the second position estimate.

In a second aspect, alone or in combination with the first aspect, the first set of ranging measurements and the estimated position of the V-UE are received from the P-UE.

In a third aspect, alone or in combination with one or more of the first and second aspects, the second set of ranging measurements is received from the one or more base stations.

In a fourth aspect, alone or in combination with one or more of the first through third aspects, process 800 includes receiving a request for positioning information from the P-UE, wherein the estimated position of the P-UE is transmitted to the P-UE based at least in part on the request for positioning information.

In a fifth aspect, alone or in combination with one or more of the first through fourth aspects, the request for positioning information indicates a periodic reporting interval, and the estimated position of the P-UE is transmitted to the P-UE based at least in part on the periodic reporting interval expiring.

In a sixth aspect, alone or in combination with one or more of the first through fifth aspects, process 800 includes determining an estimated position of the V-UE based at least in part on ranging measurements associated with PRSs communicated over a sidelink between the V-UE and one or more other P-UEs, and transmitting, to the P-UE, the estimated position of the V-UE based at least in part on the request for positioning information including a request for positioning information associated with the V-UE.

In a seventh aspect, alone or in combination with one or more of the first through sixth aspects, the request for positioning information indicates a periodic reporting interval, and the estimated position of the P-UE and the estimated position of the V-UE are transmitted to the P-UE based at least in part on the periodic reporting interval expiring.

In an eighth aspect, alone or in combination with one or more of the first through seventh aspects, process 800 includes receiving, from the P-UE, a message configuring one or more triggering events for reporting positioning information to the P-UE, wherein the estimated position of the P-UE and/or an estimated position of the V-UE are transmitted to the P-UE based at least in part on an occurrence of the one or more triggering events.

In a ninth aspect, alone or in combination with one or more of the first through eighth aspects, the one or more triggering events include a variance between one or more parameters included in the first set of ranging measurements and one or more parameters included in the second set of ranging measurements satisfying a threshold.

In a tenth aspect, alone or in combination with one or more of the first through ninth aspects, the one or more triggering events include receiving an initial reporting of the first set of ranging measurements from the P-UE.

In an eleventh aspect, alone or in combination with one or more of the first through tenth aspects, the one or more triggering events include a distance between the estimated position of the P-UE and an estimated position of the V-UE or one or more other V-UEs satisfying a threshold.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
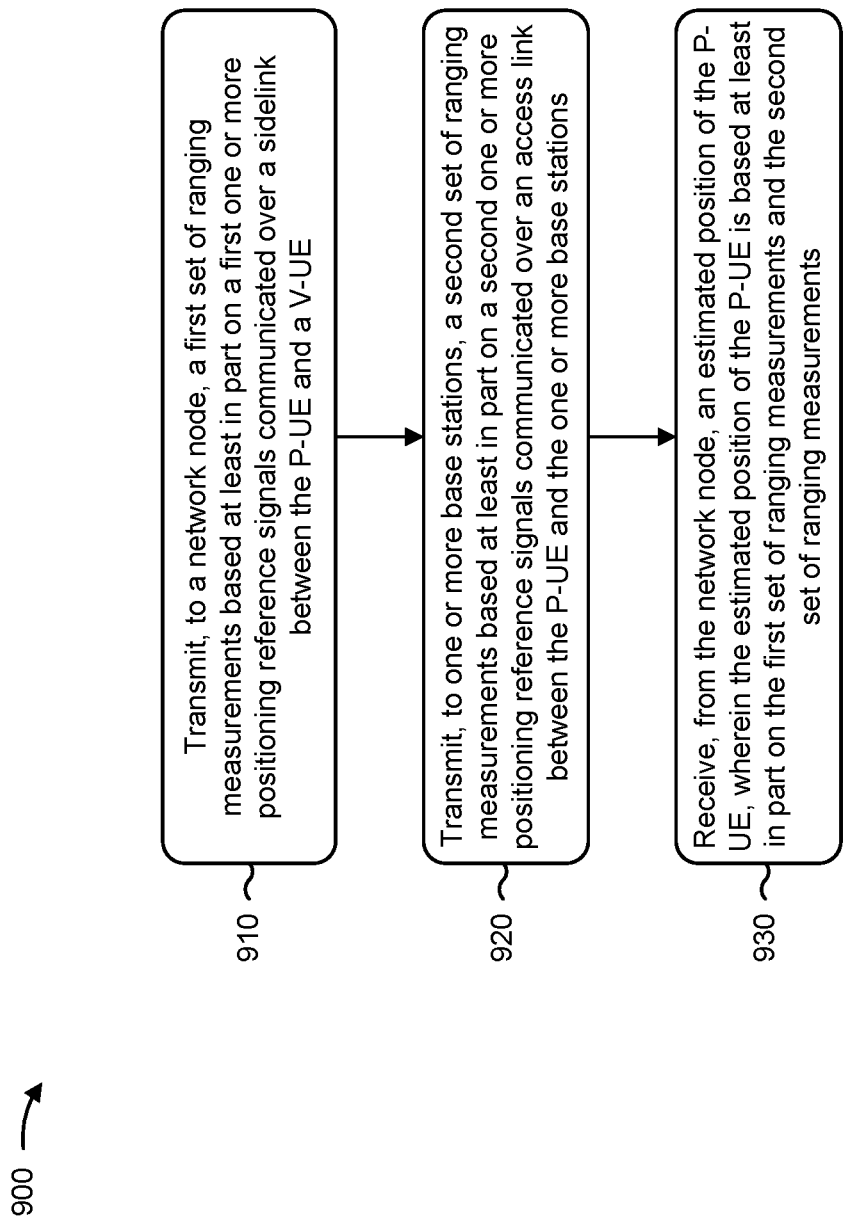

FIG. 9 is a diagram illustrating an example process 900 performed, for example, by a P-UE, in accordance with the present disclosure. Example process 900 is an example where the P-UE (e.g., UE 120 and/or the like) performs operations associated with V2P positioning with UE and network assistance.

As shown in FIG. 9, in some aspects, process 900 may include transmitting, to a network node, a first set of ranging measurements based at least in part on one or more PRSs communicated over a sidelink between the P-UE and a V-UE (block 910). For example, the P-UE may transmit (e.g., using controller/processor 280, transmit processor 264, Tx MIMO processor 266, MOD 254, antenna 252, memory 282, and/or the like), to a network node, a first set of ranging measurements based at least in part on one or more PRSs communicated over a sidelink between the P-UE and a V-UE, as described above.

As further shown in FIG. 9, in some aspects, process 900 may include transmitting, to one or more base stations, a second set of ranging measurements based at least in part on one or more PRSs communicated over an access link between the P-UE and the one or more base stations (block 920). For example, the P-UE may transmit (e.g., using controller/processor 280, transmit processor 264, Tx MIMO processor 266, MOD 254, antenna 252, memory 282, and/or the like), to one or more base stations, a second set of ranging measurements based at least in part on one or more PRSs communicated over an access link between the P-UE and the one or more base stations, as described above.

As further shown in FIG. 9, in some aspects, process 900 may include receiving, from the network node, an estimated position of the P-UE, wherein the estimated position of the P-UE is based at least in part on the first set of ranging measurements and the second set of ranging measurements (block 930). For example, the P-UE may receive (e.g., using antenna 252, DEMOD 254, MIMO detector 256, receive processor 258, controller/processor 280, memory 282, and/or the like), from the network node, an estimated position of the P-UE, as described above. In some aspects, the estimated position of the P-UE is based at least in part on the first set of ranging measurements and the second set of ranging measurements.

Process 900 may include additional aspects, such as any single aspect or any combination of aspects described below and/or in connection with one or more other processes described elsewhere herein.

In a first aspect, process 900 includes transmitting an estimated position of the V-UE to the network node, wherein the estimated position of the P-UE is further based at least in part on the estimated position of the V-UE and positions of the one or more base stations.

In a second aspect, alone or in combination with the first aspect, process 900 includes receiving, over the sidelink from the V-UE, a BSM that indicates the estimated position of the V-UE.

In a third aspect, alone or in combination with one or more of the first and second aspects, process 900 includes transmitting a request for positioning information to the network node, wherein the estimated position of the P-UE is received from the network node based at least in part on the request for positioning information.

In a fourth aspect, alone or in combination with one or more of the first through third aspects, the request for positioning information indicates a periodic reporting interval, and the estimated position of the P-UE is received from the network node based at least in part on the periodic reporting interval expiring.

In a fifth aspect, alone or in combination with one or more of the first through fourth aspects, process 900 includes receiving, from the network node, an estimated position of the V-UE based at least in part on the request for positioning information including a request for positioning information associated with the V-UE.

In a sixth aspect, alone or in combination with one or more of the first through fifth aspects, the request for positioning information indicates a periodic reporting interval, and the estimated position of the P-UE and the estimated position of the V-UE are received from the network node based at least in part on the periodic reporting interval expiring.

In a seventh aspect, alone or in combination with one or more of the first through sixth aspects, the request for positioning information is transmitted to the network node based at least in part on a variance associated with one or more local sensors satisfying a first threshold, or based at least in part on a variance associated with the first set of ranging measurements satisfying a second threshold.

In an eighth aspect, alone or in combination with one or more of the first through seventh aspects, the request for positioning information is transmitted to the network node based at least in part on receiving one or more BSMs indicating a presence of one or more V-UEs.

In a ninth aspect, alone or in combination with one or more of the first through eighth aspects, process 900 includes transmitting, to the network node, a message configuring one or more triggering events for reporting positioning information to the P-UE, wherein one or more of the estimated position of the P-UE or an estimated position of the V-UE are received from the network node based at least in part on an occurrence of the one or more triggering events.

In a tenth aspect, alone or in combination with one or more of the first through ninth aspects, the one or more triggering events include a variance between one or more parameters included in the first set of ranging measurements and one or more parameters included in the second set of ranging measurements satisfying a threshold.

In an eleventh aspect, alone or in combination with one or more of the first through tenth aspects, the one or more triggering events include receiving an initial reporting of the first set of ranging measurements from the P-UE.

In a twelfth aspect, alone or in combination with one or more of the first through eleventh aspects, the one or more triggering events include a distance between the estimated position of the P-UE and an estimated position of the V-UE or one or more other V-UEs satisfying a threshold.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
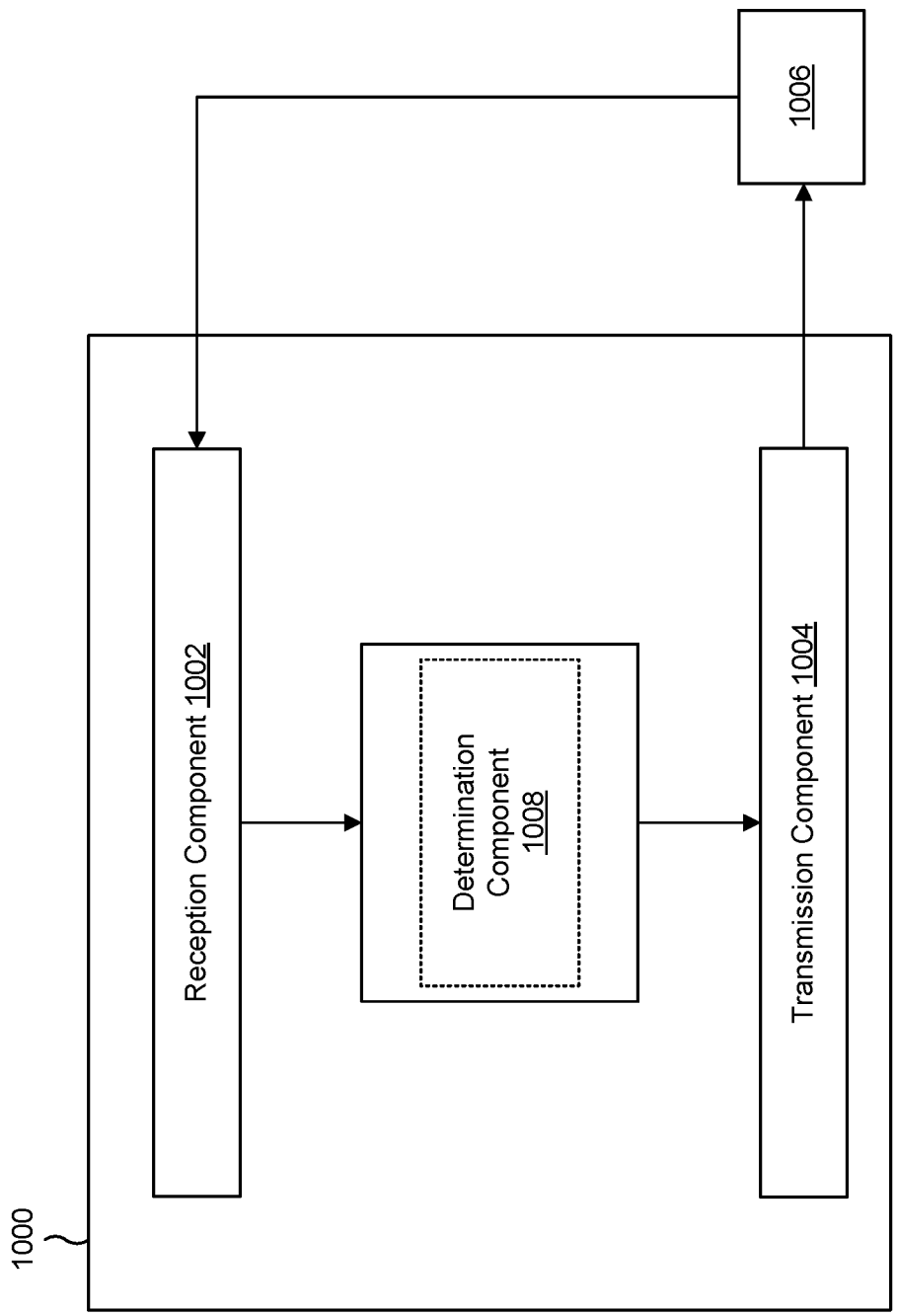
FIGS. 10-11 are diagrams illustrating example apparatuses for wireless communication, in accordance with the present disclosure.

FIG. 10 is a block diagram of an example apparatus 1000 for wireless communication. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIG. 6 and/or FIGS. 7A-7D. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station or network controller described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the network node described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the network node described above in connection with FIG. 2. In some aspects, the transmission component 1004 may be co-located with the reception component 1002 in a transceiver.

The reception component 1002 may receive a first set of ranging measurements based at least in part on a first one or more positioning reference signals communicated over a sidelink between a P-UE and a V-UE. The reception component 1002 may receive a second set of ranging measurements based at least in part on a second one or more positioning reference signals communicated over an access link between the P-UE and one or more base stations. The transmission component 1004 may transmit, to the P-UE, an estimated position of the P-UE, wherein the estimated position of the P-UE is based at least in part on the first set of ranging measurements and the second set of ranging measurements.

The determination component 1008 may determine a first position estimate for the P-UE based at least in part on the first set of ranging measurements and an estimated position of the V-UE.

The determination component 1008 may determine a second position estimate for the P-UE based at least in part on the second set of ranging measurements and positions of the one or more base stations, wherein the estimated position of the P-UE is based at least in part on the first position estimate and the second position estimate.

The reception component 1002 may receive a request for positioning information from the P-UE, wherein the estimated position of the P-UE is transmitted to the P-UE based at least in part on the request for positioning information.

The determination component 1008 may determine an estimated position of the V-UE based at least in part on ranging measurements associated with positioning reference signals communicated over a sidelink between the V-UE and one or more other P-UEs.

The transmission component 1004 may transmit, to the P-UE, the estimated position of the V-UE based at least in part on the request for positioning information including a request for positioning information associated with the V-UE.

The reception component 1002 may receive, from the P-UE, a message configuring one or more triggering events for reporting positioning information to the P-UE, wherein one or more of the estimated position of the P-UE or an estimated position of the V-UE are transmitted to the P-UE based at least in part on an occurrence of the one or more triggering events.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
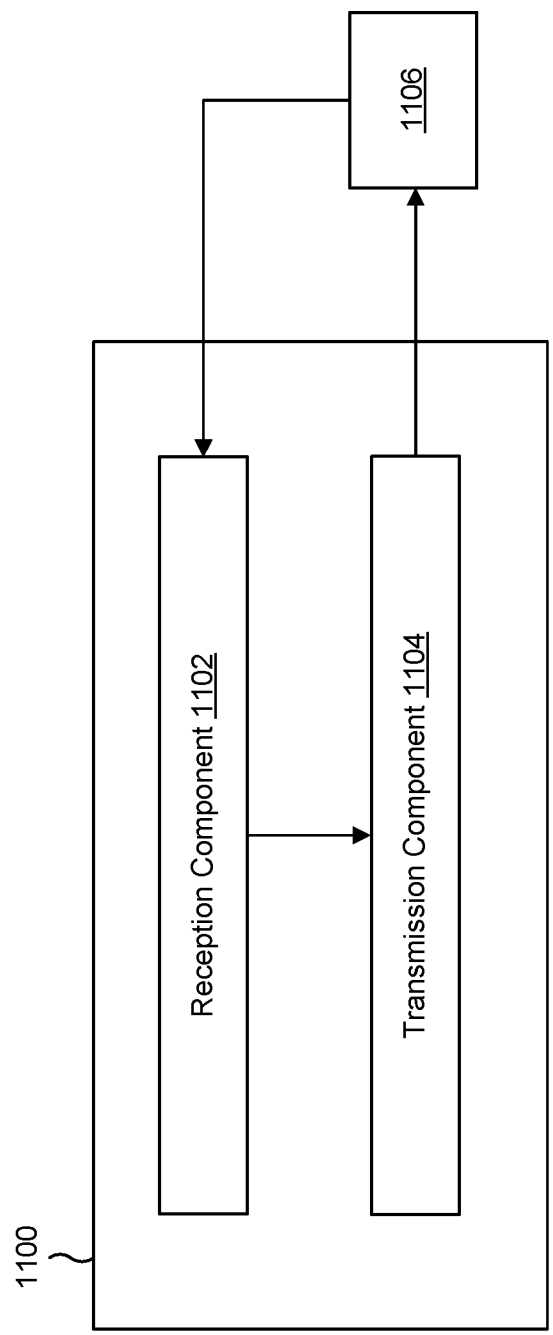

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104.

In some aspects, the apparatus 1100 may be configured to perform one or more operations described herein in connection with FIG. 6 and/or FIGS. 7A-7D. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The transmission component 1104 may transmit, to a network node, a first set of ranging measurements based at least in part on a first one or more positioning reference signals communicated over a sidelink between the P-UE and a vehicle UE (V-UE). The transmission component 1104 may transmit, to one or more base stations, a second set of ranging measurements based at least in part on a second one or more positioning reference signals communicated over an access link between the P-UE and the one or more base stations. The reception component 1102 may receive, from the network node, an estimated position of the P-UE, wherein the estimated position of the P-UE is based at least in part on the first set of ranging measurements and the second set of ranging measurements.

The transmission component 1104 may transmit an estimated position of the V-UE to the network node, wherein the estimated position of the P-UE is further based at least in part on the estimated position of the V-UE and positions of the one or more base stations.

The transmission component 1104 may transmit a request for positioning information to the network node, wherein the estimated position of the P-UE is received from the network node based at least in part on the request for positioning information.

The reception component 1102 may receive, from the network node, an estimated position of the V-UE based at least in part on the request for positioning information including a request for positioning information associated with the V-UE.

The transmission component 1104 may transmit, to the network node, a message configuring one or more triggering events for reporting positioning information to the P-UE, wherein one or more of the estimated position of the P-UE or an estimated position of the V-UE are received from the network node based at least in part on an occurrence of the one or more triggering events.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a network node, comprising: receiving a first set of ranging measurements based at least in part on a first one or more positioning reference signals communicated over a sidelink between a P-UE and a V-UE; receiving a second set of ranging measurements based at least in part on a second one or more positioning reference signals communicated over an access link between the P-UE and one or more base stations; and transmitting, to the P-UE, an estimated position of the P-UE, wherein the estimated position of the P-UE is based at least in part on the first set of ranging measurements and the second set of ranging measurements.

Aspect 2: The method of Aspect 1, further comprising: determining a first position estimate for the P-UE based at least in part on the first set of ranging measurements and an estimated position of the V-UE; and determining a second position estimate for the P-UE based at least in part on the second set of ranging measurements and positions of the one or more base stations, wherein the estimated position of the P-UE is based at least in part on the first position estimate and the second position estimate.

Aspect 3: The method of Aspect 2, wherein the first set of ranging measurements and the estimated position of the V-UE are received from the P-UE.

Aspect 4: The method of any of Aspects 2-3, wherein the second set of ranging measurements is received from the one or more base stations.

Aspect 5: The method of any of Aspects 1-4, further comprising: receiving a request for positioning information from the P-UE, wherein the estimated position of the P-UE is transmitted to the P-UE based at least in part on the request for positioning information.

Aspect 6: The method of Aspect 5, wherein the request for positioning information indicates a periodic reporting interval, and wherein the estimated position of the P-UE is transmitted to the P-UE based at least in part on the periodic reporting interval expiring.

Aspect 7: The method of any of Aspects 5-6, further comprising: determining an estimated position of the V-UE based at least in part on ranging measurements associated with PRSs communicated over a sidelink between the V-UE and one or more other P-UEs; and transmitting, to the P-UE, the estimated position of the V-UE based at least in part on the request for positioning information including a request for positioning information associated with the V-UE.

Aspect 8: The method of Aspect 7, wherein the request for positioning information indicates a periodic reporting interval, and wherein the estimated position of the P-UE and the estimated position of the V-UE are transmitted to the P-UE based at least in part on the periodic reporting interval expiring.

Aspect 9: The method of any of Aspects 1-8, further comprising: receiving, from the P-UE, a message configuring one or more triggering events for reporting positioning information to the P-UE, wherein one or more of the estimated position of the P-UE or an estimated position of the V-UE are transmitted to the P-UE based at least in part on an occurrence of the one or more triggering events.

Aspect 10: The method of Aspect 9, wherein the one or more triggering events include a variance between one or more parameters included in the first set of ranging measurements and one or more parameters included in the second set of ranging measurements satisfying a threshold.

Aspect 11: The method of any of Aspects 9-10, wherein the one or more triggering events include receiving an initial reporting of the first set of ranging measurements from the P-UE.

Aspect 12: The method of any of Aspects 9-11, wherein the one or more triggering events include a distance between the estimated position of the P-UE and an estimated position of the V-UE or one or more other V-UEs satisfying a threshold.

Aspect 13: A method of wireless communication performed by a P-UE, comprising: transmitting, to a network node, a first set of ranging measurements based at least in part on a first one or more positioning reference signals communicated over a sidelink between the P-UE and a V-UE; transmitting, to one or more base stations, a second set of ranging measurements based at least in part on a second one or more positioning reference signals communicated over an access link between the P-UE and the one or more base stations; and receiving, from the network node, an estimated position of the P-UE, wherein the estimated position of the P-UE is based at least in part on the first set of ranging measurements and the second set of ranging measurements.

Aspect 14: The method of Aspect 13, further comprising: transmitting an estimated position of the V-UE to the network node, wherein the estimated position of the P-UE is further based at least in part on the estimated position of the V-UE and positions of the one or more base stations.

Aspect 15: The method of Aspect 14, further comprising: receiving, over the sidelink from the V-UE, a BSM that indicates the estimated position of the V-UE.

Aspect 16: The method of any of Aspects 13-15, further comprising: transmitting a request for positioning information to the network node, wherein the estimated position of the P-UE is received from the network node based at least in part on the request for positioning information.

Aspect 17: The method of Aspect 16, wherein the request for positioning information indicates a periodic reporting interval, and wherein the estimated position of the P-UE is received from the network node based at least in part on the periodic reporting interval expiring.

Aspect 18: The method of any of Aspects 16-17, further comprising: receiving, from the network node, an estimated position of the V-UE based at least in part on the request for positioning information including a request for positioning information associated with the V-UE.

Aspect 19: The method of Aspect 18, wherein the request for positioning information indicates a periodic reporting interval, and wherein the estimated position of the P-UE and the estimated position of the V-UE are received from the network node based at least in part on the periodic reporting interval expiring.

Aspect 20: The method of any of Aspects 16-19, wherein the request for positioning information is transmitted to the network node based at least in part on a variance associated with one or more local sensors satisfying a first threshold, or based at least in part on a variance associated with the first set of ranging measurements satisfying a second threshold.

Aspect 21: The method of any of Aspects 16-20, wherein the request for positioning information is transmitted to the network node based at least in part on receiving one or more BSMs indicating a presence of one or more V-UEs.

Aspect 22: The method of any of Aspects 13-21, further comprising: transmitting, to the network node, a message configuring one or more triggering events for reporting positioning information to the P-UE, wherein one or more of the estimated position of the P-UE or an estimated position of the V-UE are received from the network node based at least in part on an occurrence of the one or more triggering events.

Aspect 23: The method of Aspect 22, wherein the one or more triggering events include a variance between one or more parameters included in the first set of ranging measurements and one or more parameters included in the second set of ranging measurements satisfying a threshold.

Aspect 24: The method of any of Aspects 22-23, wherein the one or more triggering events include receiving an initial reporting of the first set of ranging measurements from the P-UE.

Aspect 25: The method of any of Aspects 22-24, wherein the one or more triggering events include a distance between the estimated position of the P-UE and an estimated position of the V-UE or one or more other V-UEs satisfying a threshold.

Aspect 26: An apparatus for wireless communication at a device, comprising a processor; memory coupled with the processor; and instructions stored in the memory and executable by the processor to cause the apparatus to perform the method of any of Aspects 1-12.

Aspect 27: A device for wireless communication, comprising a memory and one or more processors coupled to the memory, the memory and the one or more processors configured to perform the method of any of Aspects 1-12.

Aspect 28: An apparatus for wireless communication, comprising at least one means for performing the method of any of Aspects 1-12.

Aspect 29: A non-transitory computer-readable medium storing code for wireless communication, the code comprising instructions executable by a processor to perform the method of any of Aspects 1-12.

Aspect 30: A non-transitory computer-readable medium storing a set of instructions for wireless communication, the set of instructions comprising one or more instructions that, when executed by one or more processors of a device, cause the device to perform the method of any of Aspects 1-12.

Aspect 31: An apparatus for wireless communication at a device, comprising a processor; memory coupled with the processor; and instructions stored in the memory and executable by the processor to cause the apparatus to perform the method of any of Aspects 13-25.

Aspect 32: A device for wireless communication, comprising a memory and one or more processors coupled to the memory, the memory and the one or more processors configured to perform the method of any of Aspects 13-25.

Aspect 33: An apparatus for wireless communication, comprising at least one means for performing the method of any of Aspects 13-25.

Aspect 34: A non-transitory computer-readable medium storing code for wireless communication, the code comprising instructions executable by a processor to perform the method of any of Aspects 13-25.

Aspect 35: A non-transitory computer-readable medium storing a set of instructions for wireless communication, the set of instructions comprising one or more instructions that, when executed by one or more processors of a device, cause the device to perform the method of any of Aspects 13-25.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a network node, comprising:
   receiving a first set of ranging measurements based at least in part on a first one or more positioning reference signals communicated between a first user equipment (UE) and a second UE via a sidelink;
   receiving a second set of ranging measurements based at least in part on a second one or more positioning reference signals communicated between the first UE and one or more base stations via an access link; and
   transmitting, to the first UE, an estimated position of the first UE, wherein the estimated position of the first UE is based at least in part on the first set of ranging measurements and the second set of ranging measurements.

2. The method of claim 1, further comprising:
   determining a first position estimate for the first UE based at least in part on the first set of ranging measurements and an estimated position of the second UE; and
   determining a second position estimate for the first UE based at least in part on the second set of ranging measurements and positions of the one or more base stations, wherein the estimated position of the first UE is based at least in part on the first position estimate and the second position estimate.

3. The method of claim 1, further comprising:
   receiving a request for positioning information from the first UE, wherein the estimated position of the first UE is transmitted to the first UE based at least in part on the request for positioning information.

4. The method of claim 3, wherein the request for positioning information indicates a periodic reporting interval, and wherein the estimated position of the first UE is transmitted to the first UE based at least in part on the periodic reporting interval expiring.

5. The method of claim 3, further comprising:
   determining an estimated position of the second UE based at least in part on ranging measurements associated with positioning reference signals communicated between the second UE and one or more other UEs via a sidelink; and
   transmitting, to the first UE, the estimated position of the second UE based at least in part on the request for positioning information including a request for positioning information associated with the second UE.

6. The method of claim 5, wherein the request for positioning information indicates a periodic reporting interval, and wherein the estimated position of the first UE and the estimated position of the second UE are transmitted to the first UE based at least in part on the periodic reporting interval expiring.

7. The method of claim 1, further comprising:
   receiving, from the first UE, a message configuring one or more triggering events for reporting positioning information to the first UE, wherein one or more of the estimated position of the first UE or an estimated position of the second UE are transmitted to the first UE based at least in part on an occurrence of the one or more triggering events.

8. The method of claim 7, wherein the one or more triggering events include one or more of:
   a variance between one or more parameters included in the first set of ranging measurements and one or more parameters included in the second set of ranging measurements satisfying a first threshold,
   receiving an initial reporting of the first set of ranging measurements from the first UE, or
   a distance between the estimated position of the first UE and the estimated position of the second UE or one or more other UEs satisfying a second threshold.

9. A method of wireless communication performed by a first user equipment (UE), comprising:
   transmitting, to a network node, a first set of ranging measurements based at least in part on a first one or more positioning reference signals communicated between the first UE and a second UE via a sidelink;
   transmitting, to one or more base stations, a second set of ranging measurements based at least in part on a second one or more positioning reference signals communicated between the first UE and the one or more base stations via an access link; and
   receiving, from the network node, an estimated position of the first UE, wherein the estimated position of the first UE is based at least in part on the first set of ranging measurements and the second set of ranging measurements.

10. The method of claim 9, further comprising:
    transmitting an estimated position of the second UE to the network node, wherein the estimated position of the first UE is further based at least in part on the estimated position of the second UE and positions of the one or more base stations.

11. The method of claim 9, further comprising:
transmitting a request for positioning information to the network node, wherein the estimated position of the first UE is received from the network node based at least in part on the request for positioning information.

12. The method of claim 11, wherein the request for positioning information indicates a periodic reporting interval, and wherein the estimated position of the first UE is received from the network node based at least in part on the periodic reporting interval expiring.

13. The method of claim 11, further comprising:
receiving, from the network node, an estimated position of the second UE based at least in part on the request for positioning information including a request for positioning information associated with the second UE.

14. The method of claim 13, wherein the request for positioning information indicates a periodic reporting interval, and wherein the estimated position of the first UE and the estimated position of the second UE are received from the network node based at least in part on the periodic reporting interval expiring.

15. The method of claim 11, wherein the request for positioning information is transmitted to the network node based at least in part on a variance associated with one or more local sensors satisfying a first threshold, or based at least in part on a variance associated with the first set of ranging measurements satisfying a second threshold.

16. The method of claim 11, wherein the request for positioning information is transmitted to the network node based at least in part on receiving one or more basic safety messages indicating a presence of one or more UEs.

17. The method of claim 9, further comprising:
transmitting, to the network node, a message configuring one or more triggering events for reporting positioning information to the first UE, wherein one or more of the estimated position of the first UE or an estimated position of the second UE are received from the network node based at least in part on an occurrence of the one or more triggering events.

18. The method of claim 17, wherein the one or more triggering events include one or more of:
a variance between one or more parameters included in the first set of ranging measurements and one or more parameters included in the second set of ranging measurements satisfying a first threshold,
receiving an initial reporting of the first set of ranging measurements from the first UE, or
a distance between the estimated position of the first UE and the estimated position of the second UE or one or more other UEs satisfying a second threshold.

19. A network node for wireless communication, comprising:
a transceiver;
a memory; and
one or more processors, coupled to the transceiver and the memory, configured to:
receive, via the transceiver, a first set of ranging measurements based at least in part on a first one or more positioning reference signals communicated between a first user equipment (UE) and a second UE via a sidelink;
receive, via the transceiver, a second set of ranging measurements based at least in part on a second one or more positioning reference signals communicated between the first UE and one or more base stations via an access link; and
transmit, to the first UE, via the transceiver, an estimated position of the first UE, wherein the estimated position of the first UE is based at least in part on the first set of ranging measurements and the second set of ranging measurements.

20. The network node of claim 19, wherein the one or more processors are further configured to:
determine a first position estimate for the first UE based at least in part on the first set of ranging measurements and an estimated position of the second UE; and
determine a second position estimate for the first UE based at least in part on the second set of ranging measurements and positions of the one or more base stations, wherein the estimated position of the first UE is based at least in part on the first position estimate and the second position estimate.

21. The network node of claim 19, wherein the one or more processors are further configured to:
receive a request for positioning information from the first UE, wherein the estimated position of the first UE is transmitted to the first UE based at least in part on the request for positioning information.

22. The network node of claim 21, wherein the one or more processors are further configured to:
determine an estimated position of the second UE based at least in part on ranging measurements associated with positioning reference signals communicated between the second UE and one or more other UEs via a sidelink; and
transmit, to the first UE, the estimated position of the second UE based at least in part on the request for positioning information including a request for positioning information associated with the second UE.

23. The network node of claim 19, wherein the one or more processors are further configured to:
receive, from the first UE, a message configuring one or more triggering events for reporting positioning information to the first UE, wherein one or more of the estimated position of the first UE or an estimated position of the second UE are transmitted to the first UE based at least in part on an occurrence of the one or more triggering events.

24. A first user equipment (UE) for wireless communication, comprising:
a transceiver;
a memory; and
one or more processors, coupled to the transceiver and the memory, configured to:
transmit, to a network node, via the transceiver, a first set of ranging measurements based at least in part on a first one or more positioning reference signals communicated between the first UE and a second UE via a sidelink;
transmit, to one or more base stations, via the transceiver, a second set of ranging measurements based at least in part on a second one or more positioning reference signals communicated between the first UE and the one or more base stations via an access link; and
receive, from the network node, via the transceiver, an estimated position of the first UE, wherein the estimated position of the first UE is based at least in part on the first set of ranging measurements and the second set of ranging measurements.

25. The first UE of claim 24, wherein the one or more processors are further configured to:
  transmit an estimated position of the second UE to the network node, wherein the estimated position of the first UE is further based at least in part on the estimated position of the second UE and positions of the one or more base stations.

26. The first UE of claim 24, wherein the one or more processors are further configured to:
  transmit a request for positioning information to the network node, wherein the estimated position of the first UE is received from the network node based at least in part on the request for positioning information.

27. The first UE of claim 26, wherein the one or more processors are further configured to:
  receive, from the network node, an estimated position of the second UE based at least in part on the request for positioning information including a request for positioning information associated with the second UE.

28. The first UE of claim 26, wherein the request for positioning information is transmitted to the network node based at least in part on a variance associated with one or more local sensors satisfying a first threshold, or based at least in part on a variance associated with the first set of ranging measurements satisfying a second threshold.

29. The first UE of claim 26, wherein the request for positioning information is transmitted to the network node based at least in part on receiving one or more basic safety messages indicating a presence of one or more UEs.

30. The first UE of claim 24, wherein the one or more processors are further configured to:
  transmit, to the network node, a message configuring one or more triggering events for reporting positioning information to the first UE, wherein one or more of the estimated position of the first UE or an estimated position of the second UE are received from the network node based at least in part on an occurrence of the one or more triggering events.

* * * * *